US012784961B2

(12) United States Patent
Jin et al.

(10) Patent No.: US 12,784,961 B2
(45) Date of Patent: Nov. 3, 2026

(54) MAGNETIC DEVICE AND POWER CONVERSION MODULE WITH SAME

(71) Applicant: Delta Electronics, Inc., Taoyuan City (TW)

(72) Inventors: Da Jin, Shanghai (CN); Yahong Xiong, Shanghai (CN); Litao Qian, Shanghai (CN); Qinghua Su, Shanghai (CN)

(73) Assignee: Delta Electronics, Inc., Taoyuan City (TW)

( * ) Notice: Subject to any disclaimer, the term of this patent is extended or adjusted under 35 U.S.C. 154(b) by 908 days.

(21) Appl. No.: 18/071,879

(22) Filed: Nov. 30, 2022

(65) Prior Publication Data

US 2023/0187115 A1 Jun. 15, 2023

(30) Foreign Application Priority Data

Dec. 14, 2021 (CN) ......................... 202111530956.9

(51) Int. Cl.

| | |
|---|---|
| ***H01F 27/22*** | (2006.01) |
| ***H01F 27/02*** | (2006.01) |
| ***H01F 27/26*** | (2006.01) |
| ***H01F 27/29*** | (2006.01) |
| *H02M 3/335* | (2006.01) |

(52) U.S. Cl.

CPC ............. *H01F 27/26* (2013.01); *H01F 27/02* (2013.01); *H01F 27/29* (2013.01); *H02M 3/335* (2013.01)

(58) Field of Classification Search

CPC ....................................................... H01F 27/26
USPC ......................................... 336/192, 198, 221
See application file for complete search history.

(56) References Cited

U.S. PATENT DOCUMENTS

| | | | | |
|---|---|---|---|---|
| 5,525,941 A * | 6/1996 | Roshen | ............... | H10W 70/614 336/200 |
| 6,593,837 B2 * | 7/2003 | Takayama | ............... | H01F 30/10 336/212 |
| 10,847,297 B1 * | 11/2020 | Hsu | ....................... | H01F 27/245 |

(Continued)

FOREIGN PATENT DOCUMENTS

| | | |
|---|---|---|
| CN | 106057439 A | 10/2016 |
| CN | 105210163 B | 6/2017 |

(Continued)

*Primary Examiner* — Ronald Hinson
(74) *Attorney, Agent, or Firm* — KIRTON McCONKIE; Evan R. Witt

(57) ABSTRACT

A magnetic device includes a magnetic core assembly and a winding assembly. The magnetic core assembly includes a first magnetic cover, a second magnetic cover and a plurality of magnetic legs. The second magnetic cover has a perforation. The plurality of magnetic legs are disposed between the first magnetic cover and the second magnetic cover. A middle region is defined by the plurality of magnetic legs, the first magnetic cover and the second magnetic cover. The middle region is in communication with the perforation. The middle region includes a plurality of communication portions. The winding assembly includes at least one coupled winding pair. In addition, two coupled windings of each coupled winding pair are respectively transferred through two different communication portions, and portions of the two coupled windings of each coupled winding pair are penetrated through the perforation of the second magnetic cover.

29 Claims, 16 Drawing Sheets

(56) References Cited

U.S. PATENT DOCUMENTS

| | | | | |
|---|---|---|---|---|
| 2010/0232181 | A1* | 9/2010 | Nakahori | H01F 27/2804 336/221 |
| 2010/0321960 | A1* | 12/2010 | Nakahori | H02M 3/33573 363/21.04 |
| 2014/0300442 | A1* | 10/2014 | Barthold | H05K 1/165 336/200 |
| 2014/0340940 | A1* | 11/2014 | Ouyang | H01F 27/28 336/170 |
| 2017/0330678 | A1* | 11/2017 | Harrison | H01F 3/10 |
| 2018/0226182 | A1* | 8/2018 | Fe | H01F 27/245 |
| 2019/0043653 | A1* | 2/2019 | Dai | H01F 27/306 |
| 2019/0043661 | A1* | 2/2019 | Jin | H01F 27/346 |

FOREIGN PATENT DOCUMENTS

| | | | |
|---|---|---|---|
| CN | 210606859 | U | 5/2020 |
| CN | 111933428 | A | 11/2020 |
| CN | 112104201 | A | 12/2020 |
| GB | 2299714 | A | 10/1996 |
| JP | H0755846 | A | 3/1995 |
| JP | 3091323 | U | 1/2003 |
| KR | 102227360 | B1 | 3/2021 |
| WO | 2021034745 | A1 | 2/2021 |

* cited by examiner

MAGNETIC DEVICE AND POWER CONVERSION MODULE WITH SAME

CROSS-REFERENCE TO RELATED APPLICATION

This application claims priority to China Patent Application No. 202111530956.9, filed on Dec. 14, 2021, the entire contents of which are incorporated herein by reference for all purposes.

FIELD OF THE INVENTION

The present disclosure relates to a magnetic device, and more particularly to a magnetic device for a power conversion module.

BACKGROUND OF THE INVENTION

With the advancement of Internet, cloud computing technologies, electric vehicle technologies, industrial automation technologies and associated technologies, the demands for electric power gradually increase. In other words, the demands for power sources are also increased. Consequently, the power conversion module has to be developed toward high power density and high efficiency. In order to meet the power requirements of high efficiency and high power density, the current industry practice is to increase the bus voltage in a power conversion module from 12V to 48V. Consequently, the current loss on the bus and the cost of the bus are reduced. For achieving the purpose of power conversion, a power conversion module with two stage converters (e.g., a fixed-ratio converter and a buck converter) is employed to increase the bus voltage from 12V to 48V. However, the efficiency of the power conversion module with two stage converters is low, and the applications thereof are limited.

Therefore, there is a need of providing an improved power magnetic device and a power conversion module with the magnetic device in order to overcome the drawbacks of the conventional technologies.

SUMMARY OF THE INVENTION

An object of the present disclosure provides a magnetic device with small volume, high efficiency and wide application.

Another object of the present disclosure provides a magnetic device and a power conversion module. The power conversion module has reduced volume, enhanced operating efficiency and increased applications.

In accordance with an aspect of the present disclosure, a magnetic device is provided. The magnetic device includes a magnetic core assembly and a winding assembly. The magnetic core assembly includes a first magnetic cover, a second magnetic cover and a plurality of magnetic legs. The second magnetic cover has at least one perforation. The plurality of magnetic legs are disposed between the first magnetic cover and the second magnetic cover. A middle region is defined by the plurality of magnetic legs, the first magnetic cover and the second magnetic cover. The middle region is in communication with the at least one perforation. The middle region includes a plurality of communication portions. The middle region is in communication with an external portion of the magnetic core assembly through the plurality of communication portions. The winding assembly includes at least one coupled winding pair. In addition, two coupled windings of each coupled winding pair are respectively transferred through two different communication portions, and portions of the two coupled windings of each coupled winding pair are disposed within the middle region and penetrated through the at least one perforation of the second magnetic cover.

In accordance with another aspect of the present disclosure, a power conversion module is provided. The power conversion module includes a magnetic device. The magnetic device includes a magnetic core assembly and a winding assembly. The magnetic core assembly includes a first magnetic cover, a second magnetic cover and a plurality of magnetic legs. The second magnetic cover has at least one perforation. The plurality of magnetic legs are disposed between the first magnetic cover and the second magnetic cover. A middle region is defined by the plurality of magnetic legs, the first magnetic cover and the second magnetic cover. The middle region is in communication with the at least one perforation. The middle region includes a plurality of communication portions. The middle region is in communication with an external portion of the magnetic core assembly through the plurality of communication portions. The winding assembly includes at least one coupled winding pair. In addition, two coupled windings of each coupled winding pair are respectively transferred through two different communication portions, and portions of the two coupled windings of each coupled winding pair are disposed within the middle region and penetrated through the at least one perforation of the second magnetic cover.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
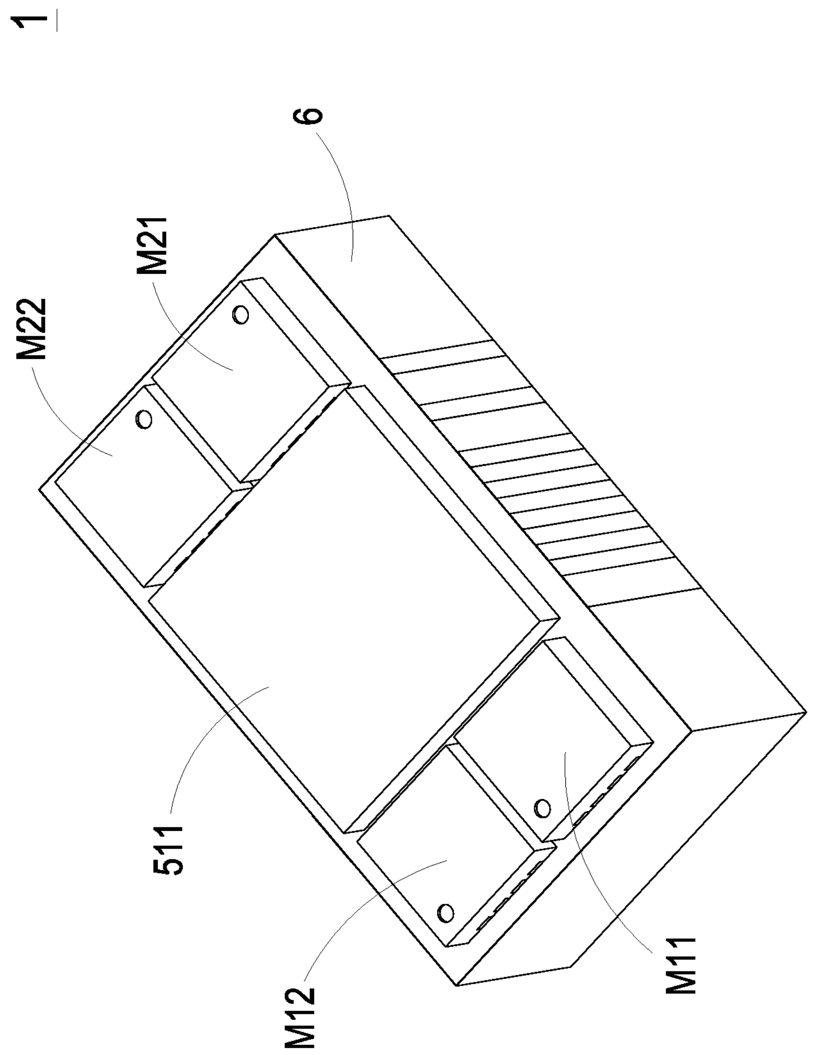
FIG. 1A is a schematic perspective view illustrating the structure of a power conversion module according to a first embodiment of the present disclosure.
Figure 1B:
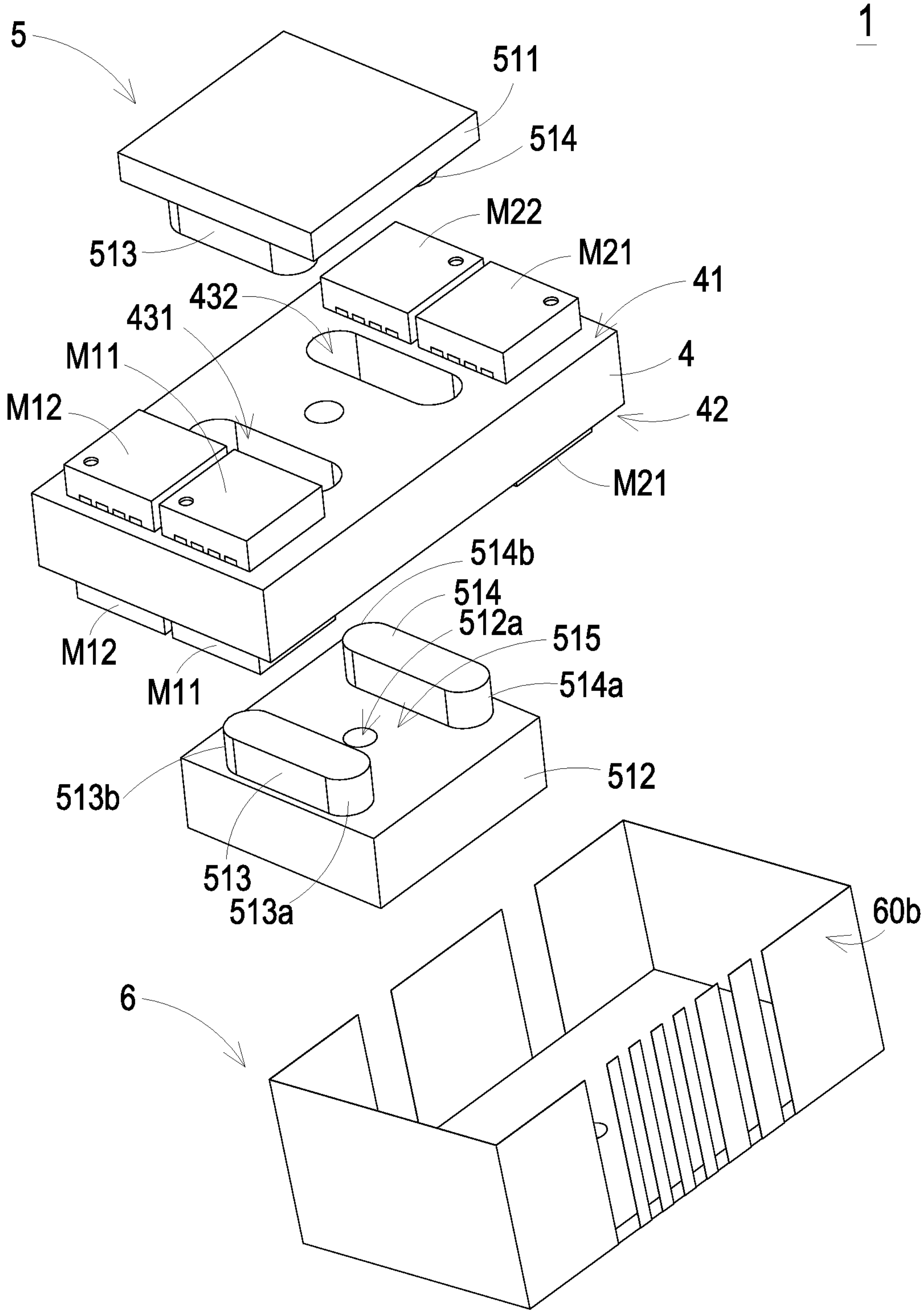
FIG. 1B is a schematic exploded view illustrating the power conversion module as shown in FIG. 1A.
Figure 1C:
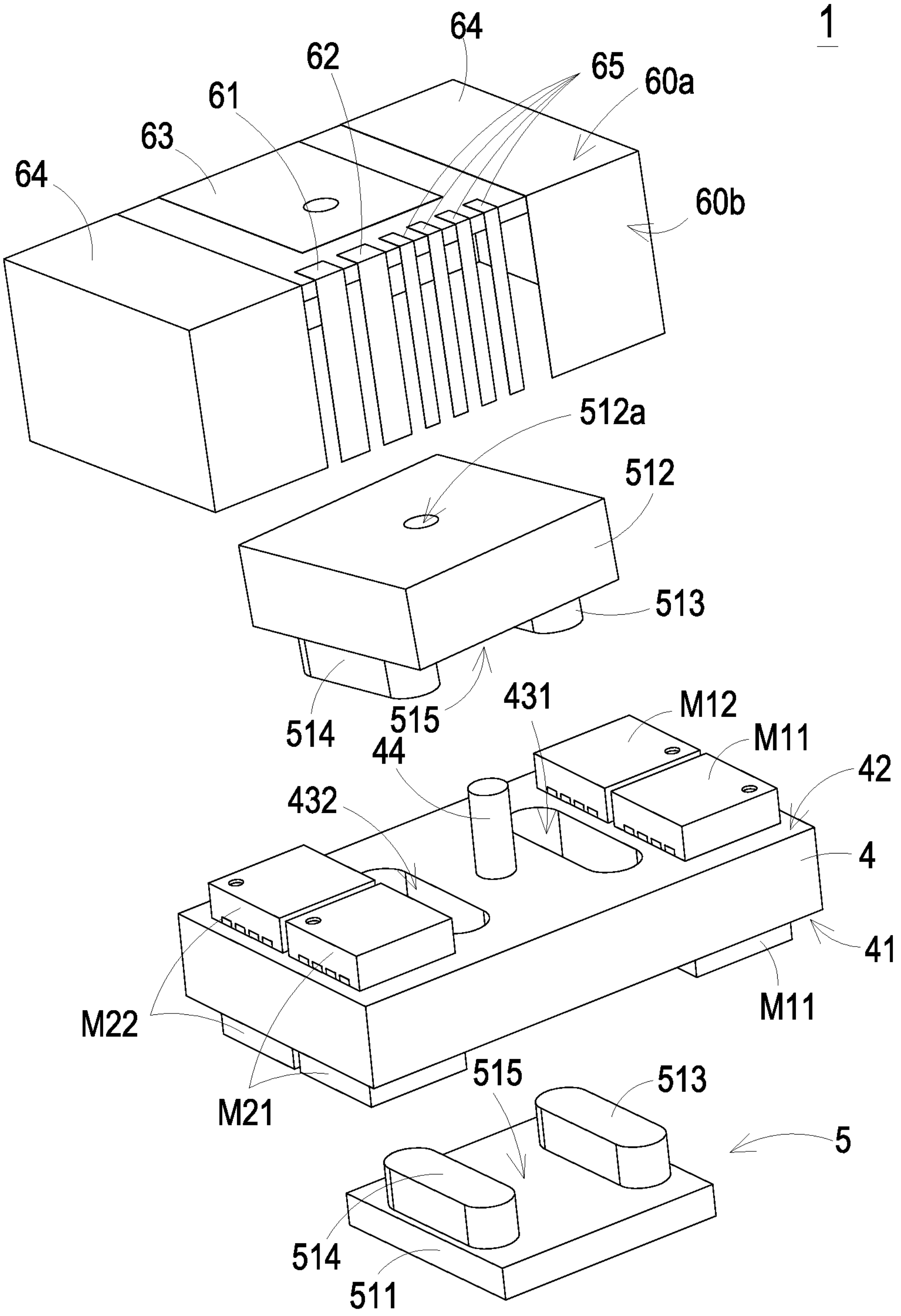
FIG. 1C is a schematic exploded view illustrating the power conversion module as shown in FIG. 1A and taken along another viewpoint.
Figure 1D:
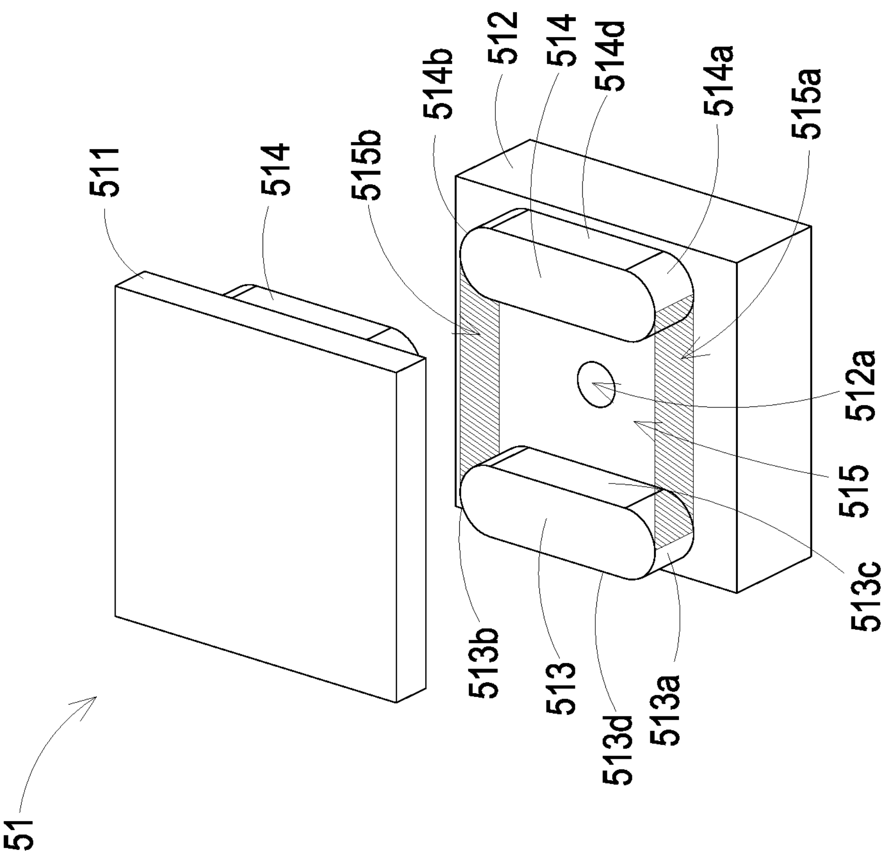
FIG. 1D is a schematic exploded view illustrating a magnetic core assembly of the power conversion module as shown in FIG. 1A.
Figure 2:
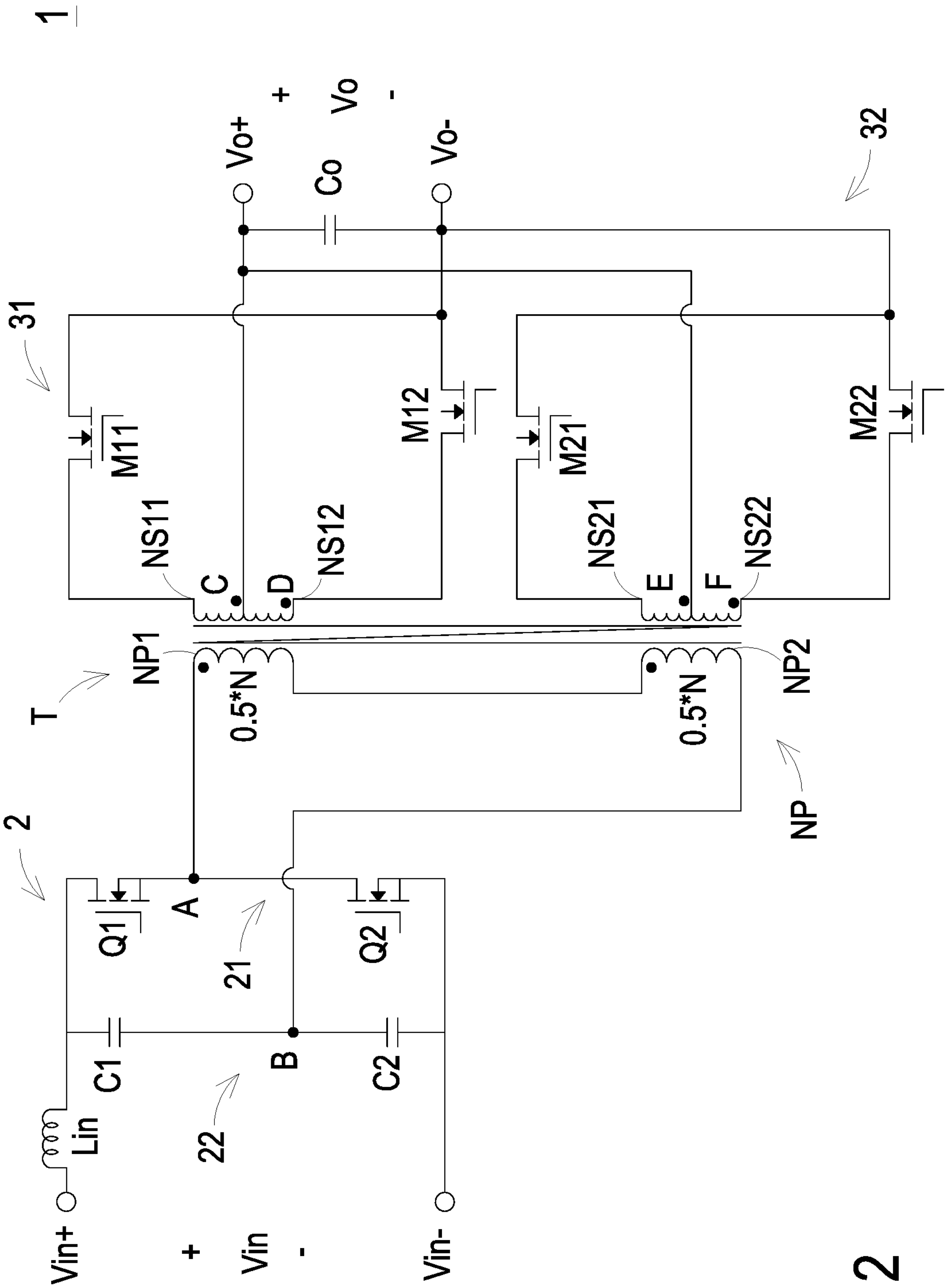
FIG. 2 is a schematic circuit diagram illustrating the circuitry topology of the power conversion module as shown in FIG. 1A.
Figure 3:
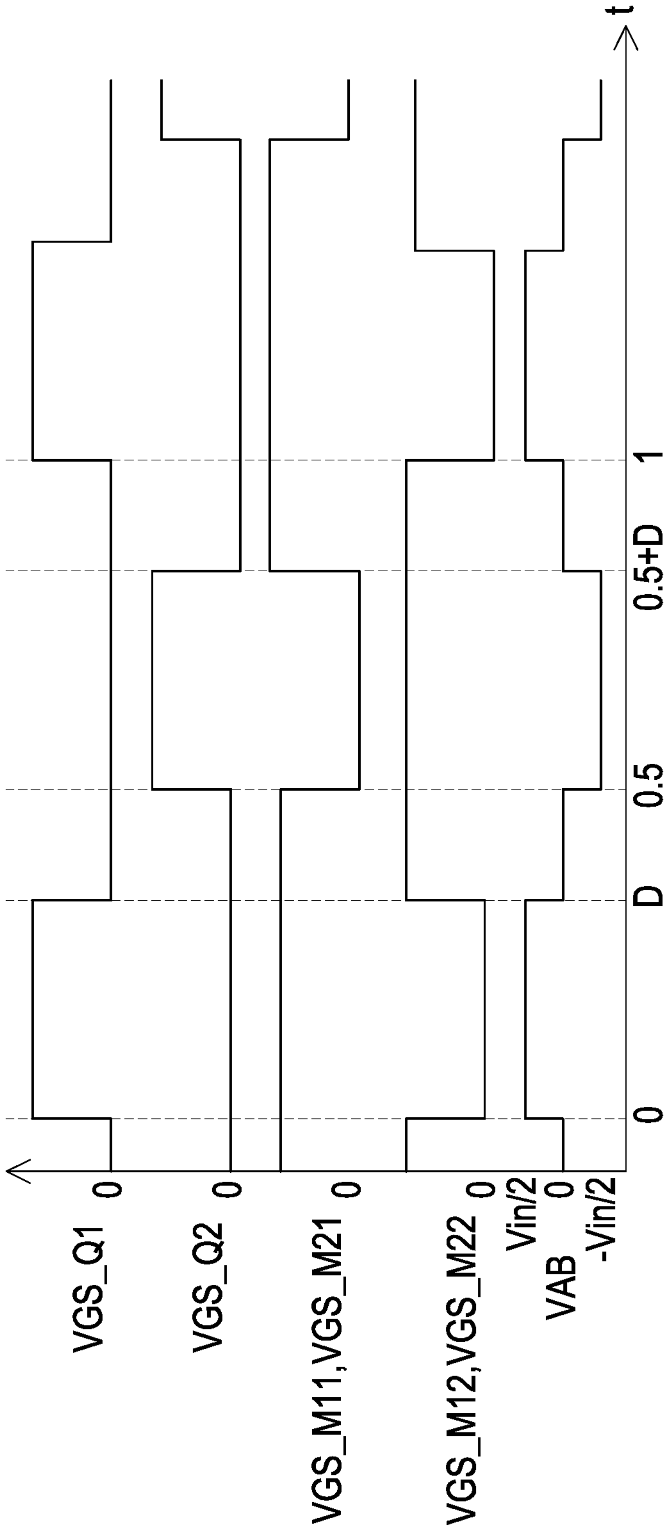
FIG. 3 is a schematic timing waveform diagram illustrating associated voltage signals of the power conversion module as shown in FIG. 1A.
Figure 4:
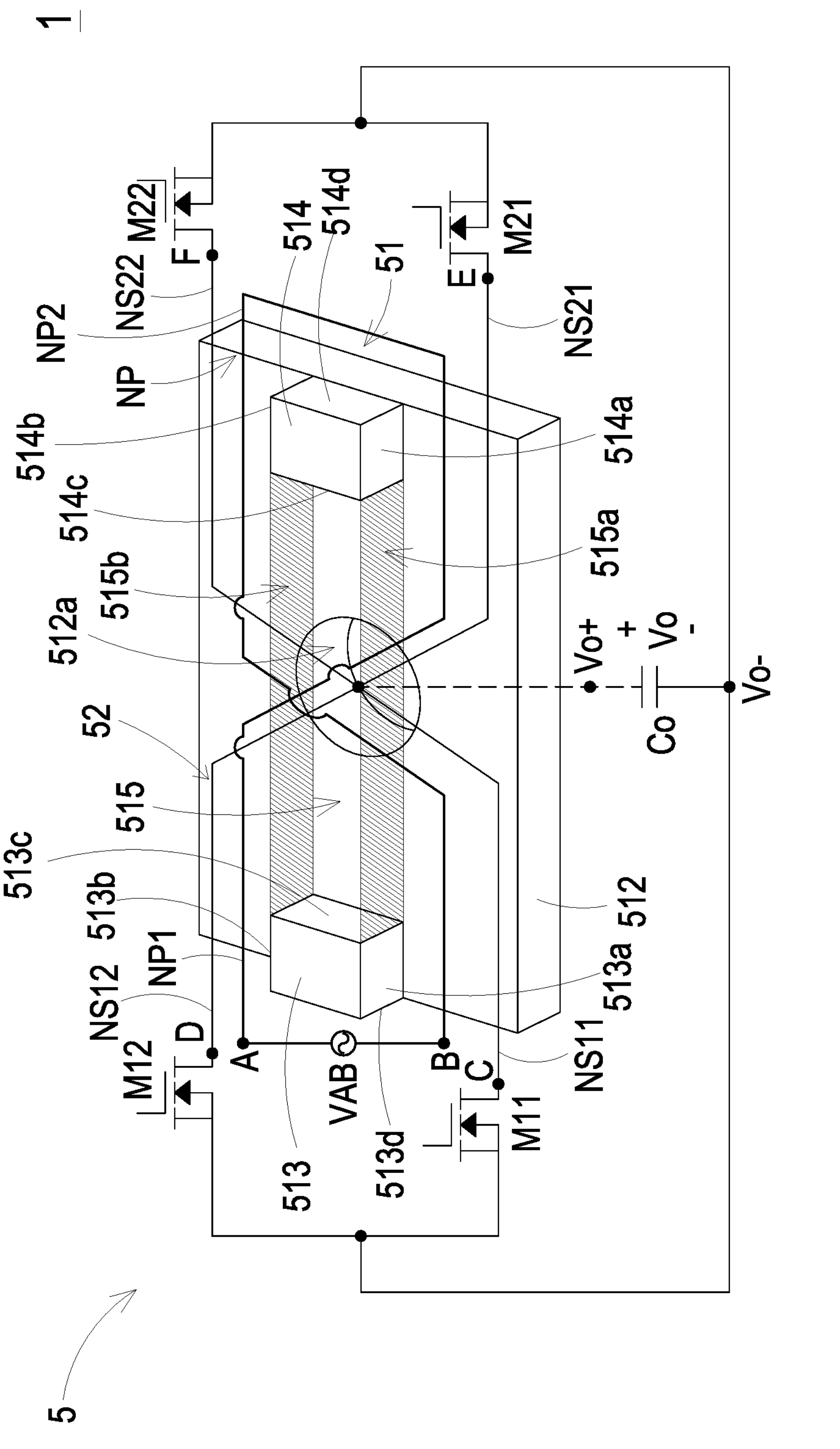
FIG. 4 schematically illustrates the magnetic core assembly and the winding assembly in the magnetic device of the power conversion module as shown in FIG. 1A, in which the first magnetic cover is not shown.

Please refer to FIGS. 1A, 1B, 1C, 1D, 2, 3 and 4. FIG. 1A is a schematic perspective view illustrating the structure of a power conversion module according to a first embodiment of the present disclosure. FIG. 1B is a schematic exploded view illustrating the power conversion module as shown in FIG. 1A. FIG. 1C is a schematic exploded view illustrating the power conversion module as shown in FIG. 1A and taken along another viewpoint. FIG. 1D is a schematic exploded view illustrating a magnetic core assembly of the power conversion module as shown in FIG. 1A. FIG. 2 is a schematic circuit diagram illustrating the circuitry topology of the power conversion module as shown in FIG. 1A. FIG. 3 is a schematic timing waveform diagram illustrating associated voltage signals of the power conversion module as shown in FIG. 1A. FIG. 4 schematically illustrates the magnetic core assembly and the winding assembly in the magnetic device of the power conversion module as shown in FIG. 1A, in which the first magnetic cover is not shown.

The present disclosure provides a power conversion module 1. As shown in FIG. 2, the power conversion module 1 includes an input positive terminal Vin+, an input negative terminal Vin−, an output positive terminal Vo+, an output negative terminal Vo−, a switching circuit 2, a transformer T, a first rectifying circuit 31, a second rectifying circuit 32 and an output capacitor Co.

The switching circuit 2 includes an input inductor Lin, a switch bridge arm 21 and a capacitor bridge arm 22. The first terminal of the input inductor Lin is electrically connected with the input positive terminal Vin+. The switch bridge arm 21 and the capacitor bridge arm 22 are collaboratively formed as a bridge circuit. The switch bridge arm 21 is electrically connected between the second terminal of the input inductor Lin and the input negative terminal Vin−. The switch bridge arm 21 includes an upper switch Q1 and a lower switch Q2. The upper switch Q1 and the lower switch Q2 are connected in series and connected with a midpoint A of the switch bridge arm 21. The capacitor bridge arm 22 is electrically connected between the second terminal of the input inductor Lin and the input negative terminal Vin−. The capacitor bridge arm 22 and the switch bridge arm 21 are connected with each other in parallel. The capacitor bridge arm 22 includes a first capacitor C1 and a second capacitor C2. The first capacitor C1 and the second capacitor C2 are connected with each other in series. Moreover, the first capacitor C1 and the second capacitor C2 are connected with a midpoint B of the capacitor bridge arm 22.

The transformer T includes a primary winding assembly NP, a first secondary winding NS11, a second secondary winding NS12, a third secondary winding NS21 and a fourth secondary winding NS22. The primary winding assembly NP includes a first primary winding NP1 and a second primary winding NP2, which are serially connected between the midpoint A of the switch bridge arm 21 and the midpoint B of the capacitor bridge arm 22. The first terminal of the first primary winding NP1 (i.e., the first terminal of the primary winding NP) is electrically connected with the midpoint A of the switch bridge arm 21. The second terminal of the first primary winding NP1 is connected with the first terminal of the second primary winding NP2. The second terminal of the second winding primary winding NP2 (i.e., the second terminal of the primary winding assembly NP) is electrically connected with the midpoint B of the capacitor bridge arm 22. The first terminal of the first primary winding NP1 and the first terminal of the second primary winding NP2 are common-polarity terminals (for example, dotted terminals). That is, the polarity of the first terminal of the first primary winding NP1 and the polarity of the first terminal of the second primary winding NP2 are identical. The second terminal of the first primary winding NP1 and the second terminal of the second primary winding NP2 are common-polarity terminals (for example, undotted terminals). That is, the polarity of the second terminal of the first primary winding NP1 and the polarity of the second terminal of the second primary winding NP2 are identical. The polarity of the second terminal of the first primary winding NP1 and the polarity of the first terminal of the second primary winding NP2 are opposite. The first primary winding NP1, the second primary winding NP2 and the switching circuit 2 are collaboratively formed as a primary circuit of the power conversion module 1.

In an embodiment, the primary winding assembly NP has N turns, wherein N is a multiple of the number of the primary windings of the primary winding assembly NP. Moreover, the first primary winding NP1 has 0.5N turns, and the second primary winding NP2 has 0.5N turns. For example, in case that the primary winding assembly NP includes 2 primary windings, N is a multiple of 2.

The first secondary winding NS11 and the second secondary winding NS12 are connected with each other in series. The first secondary winding NS11 and the second secondary winding NS12 are magnetically coupled with the first primary winding NP1. The second terminal of the first secondary winding NS11 and the first terminal of the second secondary winding NS12 are electrically connected with each other. Moreover, the second terminal of the first secondary winding NS11 and the first terminal of the second secondary winding NS12 are electrically connected with the output positive terminal Vo+. The polarity of the second terminal of the first secondary winding NS11 and the polarity of the first terminal of the second secondary winding NS12 are opposite. The polarity of the first terminal of the first secondary winding NS11 and the polarity of the first terminal of the first primary winding NP1 (i.e., the dotted terminal) are opposite. The polarity of the second terminal of the second secondary winding NS12 and the polarity of the first terminal of the first primary winding NP1 (i.e., the dotted terminal) are identical. In an embodiment, each of the first secondary winding NS11 and the second secondary winding NS12 has one turn.

The first rectifying circuit 31 includes a first rectifying switch M11 and a second rectifying switch M12. The drain terminal of the first rectifying switch M11 is electrically connected with the first terminal of the first secondary winding NS11. The drain terminal of the second rectifying switch M12 is electrically connected with the second terminal of the second secondary winding NS12. The source terminal of the first rectifying switch M11 and the source terminal of the second rectifying switch M12 are connected with each other. Moreover, the source terminal of the first rectifying switch M11 and the source terminal of the second rectifying switch M12 are electrically connected with the output negative terminal Vo−. The first secondary winding NS11, the second secondary winding NS12 and the first rectifying circuit 31 are collaboratively formed as a first secondary circuit of the power conversion module 1.

The third secondary winding NS21 and the fourth secondary winding NS22 are connected with each other in series. The third secondary winding NS21 and the fourth secondary winding NS22 are magnetically coupled with the second primary winding NP2. The second terminal of the third secondary winding NS21 and the first terminal of the fourth secondary winding NS22 are electrically connected with each other. Moreover, the second terminal of the third secondary winding NS21 and the first terminal of the fourth secondary winding NS22 are electrically connected with the output positive terminal Vo+. The polarity of the second terminal of the third secondary winding NS21 and the polarity of the first terminal of the fourth secondary winding NS22 are opposite. The polarity of the first terminal of the third secondary winding NS21 and the polarity of the first terminal of the second primary winding NP2 (i.e., the dotted terminal) are opposite. The polarity of the second terminal of the fourth secondary winding NS22 and the polarity of the first terminal of the second primary winding NP2 (i.e., the dotted terminal) are identical. In an embodiment, each of the third secondary winding NS21 and the fourth secondary winding NS22 has one turn.

The second rectifying circuit 32 includes a third rectifying switch M21 and a fourth rectifying switch M22. The drain terminal of the third rectifying switch M21 is electrically connected with the first terminal of the third secondary winding NS21. The drain terminal of the fourth rectifying switch M22 is electrically connected with the second terminal of the fourth secondary winding NS22. The source terminal of the third rectifying switch M21 and the source terminal of the fourth rectifying switch M22 are connected with each other. Moreover, the source terminal of the third rectifying switch M21 and the source terminal of the fourth rectifying switch M22 are electrically connected with the output negative terminal Vo−. The third secondary winding NS21, the fourth secondary winding NS22 and the second rectifying circuit 32 are collaboratively formed as a second secondary circuit of the power conversion module 1. The two terminals of the output capacitor Co are electrically connected with the output positive terminal Vo+ and the output negative terminal Vo−, respectively.

In an embodiment, the power conversion module 1 further includes a plurality of driving circuits (not shown) and a control circuit (not shown). Preferably, the number of the driving circuits is equal to the number of the switches. For example, the power conversion module 1 includes six driving circuits. The six driving circuits are electrically connected with the upper switch Q1, the second switch Q2, the first rectifying switch M11, the second rectifying switch M12, the third rectifying switch M21 and the fourth rectifying switch M22, respectively. The control circuit is electrically connected with the six driving circuits. The control circuit generates six driving signals. Each driving circuit generates a PWM signal to drive the corresponding switch according to the corresponding driving signal. Since the switches are driven according to the corresponding PWM signals, the function of decreasing the input voltage Vin to the output voltage Vo can be achieved. The operation of the power conversion module 1 will be described as follows by referring to the waveform diagram of the driving signals for driving the corresponding switches.

Please refer to FIGS. 2 and 3. In FIG. 3, VGS_Q1 denotes the gate-source voltage of the upper switch Q1, VGS_Q2 denotes the gate-source voltage of the lower switch Q2, VGS_M11 denotes the gate-source voltage of the first rectifying switch M11, VGS_M12 denotes the gate-source voltage of the second rectifying switch M12, VGS_M21 denotes the gate-source voltage of the third rectifying switch M21, and VGS_M22 denotes the gate-source voltage of the fourth rectifying switch M22. Moreover, VAB is the voltage between the midpoint A of the switch bridge arm and the midpoint B of the capacitor bridge arm. That is, VAB is the terminal voltage between the first terminal of the first primary winding NP1 and the second terminal of the second primary winding NP2.

Please refer to FIG. 3 again. The upper switch Q1 receives a first driving signal. The waveform of the first driving signal matches the gate-source voltage VGS_Q1 of the upper switch Q1. The lower switch Q2 receives a second driving signal. The waveform of the second driving signal matches the gate-source voltage VGS_Q2 of the lower switch Q2. The duty cycle of the first driving signal and the duty cycle of the second driving signal are equal. The phase difference between the first driving signal and the second driving signal is 180 degrees.

Each of the first rectifying switch M11 and the third rectifying switch M21 receives a third driving signal. The on/off states of the first rectifying switch M11 and the on/off states of the third rectifying switch M21 are controlled according to the third driving signal. The waveform of the third driving signal matches the gate-source voltage VGS_M11 of the first rectifying switch M11 and the gate-source voltage VGS_M21 of the third rectifying switch M21. As mentioned above, the first secondary winding NS11 is connected with the first rectifying switch M11, and the third secondary winding NS21 is connected with the third rectifying switch M21. Consequently, the frequency and the phase of the terminal voltage across the two terminals of the first secondary winding NS11 and the frequency and the phase of the terminal voltage across the two terminals of the third secondary winding NS21 are identical. The third driving signal and the second driving signal are complementary to each other.

Each of the second rectifying switch M12 and the fourth rectifying switch M22 receives a fourth driving signal. The on/off states of the second rectifying switch M12 and the on/off states of the fourth rectifying switch M22 are controlled according to the fourth driving signal. The waveform of the fourth driving signal matches the gate-source voltage VGS_M12 of the second rectifying switch M12 and the gate-source voltage VGS_M22 of the fourth rectifying switch M22. As mentioned above, the second secondary winding NS12 is connected with the second rectifying switch M12, and the fourth secondary winding NS22 is connected with the fourth rectifying switch M22. Consequently, the frequency and the phase of the terminal voltage across the two terminals of the second secondary winding NS12 and the frequency and the phase of the terminal voltage across the two terminals of the fourth secondary winding NS22 are identical. The fourth driving signal and the first driving signal are complementary to each other.

Please refer to FIG. 3. In an embodiment, the voltage VAB between the midpoint A of the switch bridge arm and the midpoint B of the capacitor bridge arm is a three-level AC voltage. That is, the terminal voltage VAB has three voltage levels, including the positive voltage (+Vin/2), 0 and the negative voltage (−Vin/2). In another embodiment, the first capacitor C1 and the second capacitor C2 of the capacitor bridge arm 22 are replaced by switches. Under this circumstance, the switching circuit 2 includes two switch bridge arms. The methods for driving the switches of the two switch bridge arms are not restricted as long as the voltage VAB has three voltage levels including the positive voltage (+Vin/2), 0 and the negative voltage (−Vin/2). In another embodiment, a blocking capacitor is arranged between the midpoint A of the switch bridge arm and the midpoint B of the capacitor bridge arm. Consequently, the DC current will not flow through the region between the midpoint A of the switch bridge arm and the midpoint B of the capacitor bridge arm.

Please refer to FIGS. 1A, 1B, 1C, 1D and 4. The power conversion module 1 is disposed on a system board (not shown). The power conversion module 1 includes a circuit board 4, a magnetic device 5, and a plurality of rectifying switches M11, M12, M21 and M22.

The circuit board 4 includes a first surface 41, a second surface 42, a first opening 431 and a second opening 432. The first surface 41 and the second surface 42 are opposed to each other. Preferably but not exclusively, the first opening 431 and the second opening 432 run through the circuit board 4.

The magnetic device 5 is used as the transformer T as shown in FIG. 2. In an embodiment, the magnetic device 5 includes a magnetic core assembly 51 and a winding assembly 52. The winding assembly 52 is disposed in the circuit board 4. The winding method of the winding assembly 52 will be described in FIG. 4.

As shown in FIGS. 1B, 1C and 1D, the magnetic core assembly 51 includes a first magnetic cover 511, a second magnetic cover 512, a first magnetic leg 513 and a second magnetic leg 514. Preferably but not exclusively, the first magnetic cover 511 is made of ferrite or iron powder with a distributed air gap. In addition, the first magnetic cover 511 is disposed on the first surface 41 of the circuit board 4. Preferably but not exclusively, the second magnetic cover 512 is made of ferrite or iron powder with a distributed air gap. In addition, the second magnetic cover 512 is disposed on the second surface 42 of the circuit board 4. Moreover, the first magnetic cover 511 and the second magnetic cover 512 are opposed to each other with respect to the circuit board 4. The second magnetic cover 512 further includes a perforation 512*a*. The perforation 512*a* is formed in a central region of the second magnetic cover 512. Moreover, the perforation 512*a* has a circular shape, a square shape or any other appropriate shape.

Preferably but not exclusively, the first magnetic leg 513 is made of ferrite or iron powder. In addition, the first magnetic leg 513 is inserted into the first opening 431 and connected between the first magnetic cover 511 and the second magnetic cover 512. The first magnetic leg 513 includes a first end 513*a*, a second end 513*b*, a third end 513*c* and a fourth end 513*d*. The first end 513*a* and the second end 513*b* are opposed to each other. The third end 513*c* and the fourth end 513*d* are opposed to each other. In addition, the third end 513*c* and the fourth end 513*d* are arranged between the first end 513*a* and the second end 513*b*. Moreover, the third end 513*c* of the first magnetic leg 513 is located beside the perforation 512*a* of the second magnetic cover 512.

As shown in FIGS. 1B and 1D, the first magnetic leg 513 includes two sub-legs. One sub-leg of the first magnetic leg 513 is connected with the first magnetic cover 511. The other sub-leg of the first magnetic leg 513 is connected with the second magnetic cover 512. In another embodiment, the first magnetic leg 513 has an integral leg structure.

Preferably but not exclusively, the second magnetic leg 514 is made of ferrite or iron powder. In addition, the second magnetic leg 514 is inserted into the second opening 432 and connected between the first magnetic cover 511 and the second magnetic cover 512. Moreover, the first magnetic leg 513 and the second magnetic leg 514 are located beside two opposite sides of the perforation 512*a* of the second magnetic cover 512. The second magnetic leg 514 includes a first end 514*a*, a second end 514*b*, a third end 514*c* and a fourth end 514*d*. The first end 514*a* and the second end 514*b* are opposed to each other. The third end 514*c* and the fourth end 514*d* are opposed to each other. The first end 514*a* of the second magnetic leg 514 and the first end 513*a* of the first magnetic leg 513 are located beside a first lateral wall of the circuit board 4. The second end 514*b* of the second magnetic leg 514 and the second end 513*b* of the first magnetic leg 513 are locate beside a second lateral wall of the circuit board 4. The third end 514*c* and the fourth end 514*d* are opposed to each other. In addition, the third end 514*c* and the fourth end 514*d* are arranged between the first end 514*a* and the second end 514*b*. Moreover, the third end 514*c* of the second magnetic leg 514 is located beside the perforation 512*a* of the second magnetic cover 512.

As shown in FIG. 1B, the second magnetic leg 514 includes two sub-legs. One sub-leg of the second magnetic leg 514 is connected with the first magnetic cover 511. The other sub-leg of the second magnetic leg 514 is connected with the second magnetic cover 512. In another embodiment, the second magnetic leg 514 has an integral leg structure.

As shown in FIGS. 1B and 1C, the first rectifying switch M11 is disposed on the circuit board 4. A portion of the first rectifying switch M11 is exposed outside the first surface 41 of the circuit board 4. Another portion of the first rectifying switch M11 is exposed outside the second surface 42 of the circuit board 4. When the first magnetic leg 513 is inserted in the first opening 431 of the circuit board 4, the first rectifying switch M11 is located beside the first magnetic leg 513. The second rectifying switch M12 is disposed on the circuit board 4 and located beside the first rectifying switch M11. A portion of the second rectifying switch M12 is exposed outside the first surface 41 of the circuit board 4. Another portion of the second rectifying switch M12 is exposed outside the second surface 42 of the circuit board 4. When the first magnetic leg 513 is inserted in the first opening 431 of the circuit board 4, the second rectifying switch M12 is located beside the first magnetic leg 513. The third rectifying switch M21 is disposed on the circuit board 4. A portion of the third rectifying switch M21 is exposed outside the first surface 41 of the circuit board 4. Another portion of the third rectifying switch M21 is exposed outside the second surface 42 of the circuit board 4. When the second magnetic leg 514 is inserted in the second opening 432 of the circuit board 4, the third rectifying switch M21 is located beside the second magnetic leg 514. The fourth rectifying switch M22 is disposed on the circuit board 4 and located beside the third rectifying switch M21. A portion of the fourth rectifying switch M22 is exposed outside the first surface 41 of the circuit board 4. Another portion of the fourth rectifying switch M22 is exposed outside the second surface 42 of the circuit board 4. When the second magnetic leg 514 is inserted in the second opening 432 of the circuit board 4, the fourth rectifying switch M22 is located beside the second magnetic leg 514.

In this embodiment, the first rectifying switch M11 and the second rectifying switch M12 are located at a first side of the magnetic core assembly 51, and the third rectifying switch M21 and the fourth rectifying switch M22 are located at a second side of the magnetic core assembly 51. Moreover, the first side and the second side of the magnetic core assembly 51 are opposed to each other.

For succinctness, the output capacitor Co in FIG. 2 is not shown in FIGS. 1A, 1B, 1C and 1D. It is noted that the output capacitor Co may be disposed on any position of the circuit board 4 or disposed on the system board. For example, the output capacitor Co is disposed on the second surface 42 of the circuit board 4. The system board is located near the second surface 42 of the circuit board 4. In the following embodiments, the output capacitor Co disposed on the system board is taken as an example.

As shown in FIG. 1D, a middle region 515 is defined by the first magnetic cover 511, the first magnetic leg 513, the second magnetic leg 514 and the second magnetic cover 512 collaboratively. When the first magnetic cover 511 is attached on the first surface 41 of the circuit board 4, the second magnetic cover 512 is attached on the second surface 42 of the circuit board 4, and the first magnetic leg 513, the second magnetic leg 514 are inserted in the circuit board 4, a portion of the circuit board 4 is accommodated within the middle region 515 of the magnetic core assembly 51. The middle region 515 of the magnetic core assembly 51 is in communication with the perforation 512*a* of the second magnetic cover 512.

The middle region 515 of the magnetic core assembly 51 further includes a first communication portion 515*a* and a second communication portion 515*b*. The first communication portion 515*a* is arranged between the first end 513*a* of the first magnetic leg 513 and the first end 514*a* of the second magnetic leg 514. The second communication portion 515*b* is arranged between the second end 513*b* of the first magnetic leg 513 and the second end 514*b* of the second magnetic leg 514. That is, the first communication portion 515*a* and the second communication portion 515*b* are located at two opposite sides of the middle region 515. The middle region 515 is in communication with the external portion of the magnetic core assembly 51 through the first communication portion 515*a* and the second communication portion 515*b*.

The method of winding the winding assembly 52 will be described with reference to FIG. 4. For succinctness, the first magnetic cover 511 of the magnetic core assembly 51 is not shown. That is, only the second magnetic cover 512 is shown in FIG. 4. As shown in FIG. 4, the winding assembly 52 includes the primary winding assembly NP (i.e., the first primary winding NP1 and the second primary winding NP2) and the four coupled windings (i.e., the first secondary winding NS11, the second secondary winding NS12, the third secondary winding NS21 and the fourth secondary winding NS22).

The first terminal of the primary winding assembly NP is close to the second end 513*b* of the first magnetic leg 513 and away from the first end 513*a* of the first magnetic leg 513. The second terminal of the primary winding assembly NP is close to the first end 513*a* of the first magnetic leg 513 and away from the second end 513*b* of the first magnetic leg 513.

From the first terminal to the second terminal, the winding assembly NP is sequentially transferred through the second communication portion 515*b*, the middle region 515, the first communication portion 515*a*, the outer side of the first end 514*a* of the second magnetic leg 514, the outer side of the fourth end 514*d* of the second magnetic leg 514, the outer side of the second end 514*b* of the second magnetic leg 514, the second communication portion 515*b*, the middle region 515 and the first communication portion 515*a*.

As shown in FIG. 4, from the first terminal to the second terminal, a portion of the primary winding assembly NP (i.e., the first primary winding NP1) is wound around the first magnetic leg 513 along a clockwise direction, and another portion of the primary winding assembly NP (i.e., the second primary winding NP2) is wound around the second magnetic leg 514 along a counterclockwise direction. Moreover, the primary winding assembly NP is transferred through the middle region 515 of the magnetic core assembly 51 for two times, and the primary winding assembly NP crosses in the middle region 515 of the magnetic core assembly 51.

Please also refer to FIG. 2. The first terminal of the primary winding assembly NP is connected with the midpoint A of the switch bridge arm 21 and thus connected with the switching circuit 2. The second terminal of the primary winding assembly NP is connected with the midpoint B of the capacitor bridge arm 22 and thus connected with the switching circuit 2. That is, the voltage across the first terminal and the second terminal of the primary winding assembly NP is equal to VAB.

In an embodiment, the primary winding assembly NP has N turns, wherein N is a multiple of the number of the primary windings of the primary winding assembly NP. Moreover, the first primary winding NP1 wound around the first magnetic leg 513 has 0.5N turns, and the second primary winding NP2 wound around the second magnetic leg 514 has 0.5N turns. For example, since the primary winding assembly NP includes two primary windings, N is a multiple of 2.

In an embodiment, the primary winding assembly NP is wound for more than two turns. That is, N is greater than 2. That is, the primary winding assembly NP is wound around each of the first magnetic leg 513 and the second magnetic leg 514 for more than one turn (e.g., X turns). That is, after the above winding process is performed for X times, the primary winding assembly NP is wound around each of the first magnetic leg 513 and the second magnetic leg 514 for X turns. For example, the primary winding assembly NP is transferred through the middle region 515 of the magnetic core assembly 51 for 2× times, and the primary winding assembly NP crosses X times in the middle region 515. Alternatively, the primary winding assembly NP is firstly wound around the first magnetic leg 513 for X turns, and then the primary winding assembly NP is wound around the second magnetic leg 514 for X turns. That is, the primary winding assembly NP is transferred through the middle region 515 of the magnetic core assembly 51 for 2× times, and the primary winding assembly NP crosses one time in the middle region 515. The method of winding the primary winding assembly NP is not restricted as long as the primary winding assembly NP is wound around each of the first magnetic leg 513 and the second magnetic leg 514 for X turns and the primary winding assembly NP cross at least one time in the middle region 515.

The first primary winding NP1 and the second primary winding NP2 are wound by using the above winding method. The associated switches are controlled according to the waveforms of FIG. 3. The amplitude of a first AC magnetic flux generated by the first primary winding NP1 and applied to the first magnetic leg 513 and the amplitude of a second AC magnetic flux generated by the second primary winding NP2 and applied to the second magnetic leg 514 are identical. However, the directions of the first AC magnetic flux and the second AC magnetic flux are opposite. Moreover, the first AC magnetic flux and the second AC magnetic flux pass through the first magnetic cover 511 and the second magnetic cover 512 to form a closed magnetic loop.

Please refer to FIG. 4. The first rectifying switch M11 and the second rectifying switch M12 are formed as the first rectifying circuit 31 as shown in FIG. 2.

The first terminal of the first secondary winding NS11 is close to the first end 513*a* of the first magnetic leg 513 and away from the second end 513*b* of the first magnetic leg 513. The first terminal of the first secondary winding NS11 is connected with the drain terminal of the first rectifying switch M11. The second terminal of the first secondary winding NS11 is located near the middle region 515 of the magnetic core assembly 51 and penetrated through the perforation 512*a* of the second magnetic cover 512. In addition, the second terminal of the first secondary winding NS11 is electrically connected with the output positive terminal Vo+. That is, the first secondary winding NS11 is transferred through the first communication portion 515*a* of the middle region 515, and a portion of the first secondary winding NS11 is penetrated through the perforation 512*a* of the second magnetic cover 512.

The second terminal of the second secondary winding NS12 is located beside the second end 513*b* of the first magnetic leg 513. Moreover, the second terminal of the second secondary winding NS12 is connected with the drain terminal of the second rectifying switch M12. The first terminal of the second secondary winding NS12 is located near the middle region 515 of the magnetic core assembly 51 and penetrated through the perforation 512*a* of the second magnetic cover 512. In addition, the first terminal of the second secondary winding NS12 is electrically connected with the output positive terminal Vo+. That is, the second secondary winding NS12 is transferred through the second communication portion 515*b* of the middle region 515, and a portion of the second secondary winding NS12 is penetrated through the perforation 512*a* of the second magnetic cover 512. Moreover, the second secondary winding NS12 and the first secondary winding NS11 are collaboratively formed as a first coupled winding pair.

Please refer to FIG. 4 again. The third rectifying switch M21 and the fourth rectifying switch M22 are formed as the second rectifying circuit 32 as shown in FIG. 2.

The first terminal of the third secondary winding NS21 is close to the first end 514*a* of the second magnetic leg 514 and away from the second end 514*b* of the second magnetic leg 514. The first terminal of the third secondary winding NS21 is connected with the drain terminal of the third rectifying switch M21. The second terminal of the third secondary winding NS21 is located near the middle region 515 of the magnetic core assembly 51 and penetrated through the perforation 512*a* of the second magnetic cover 512. In addition, the second terminal of the third secondary winding NS21 is electrically connected with the output positive terminal Vo+. That is, the third secondary winding NS21 is transferred through the first communication portion 515*a* of the middle region 515, and a portion of the third secondary winding NS21 is penetrated through the perforation 512*a* of the second magnetic cover 512.

The second terminal of the fourth secondary winding NS22 is close to the second end 514*b* of the second magnetic leg 514 and away from the first end 514*a* of the second magnetic leg 514. The second terminal of the fourth secondary winding NS22 is connected with the drain terminal of the fourth rectifying switch M22. The first terminal of the fourth secondary winding NS22 is located near the middle region 515 of the magnetic core assembly 51 and penetrated through the perforation 512*a* of the second magnetic cover 512. In addition, the first terminal of the fourth secondary winding NS22 is electrically connected with the output positive terminal Vo+. That is, the fourth secondary winding NS22 is transferred through the second communication portion 515*b* of the middle region 515, and a portion of the fourth secondary winding NS22 is penetrated through the perforation 512*a* of the second magnetic cover 512. Moreover, the third secondary winding NS21 and the fourth secondary winding NS22 are collaboratively formed as a second coupled winding pair.

The source terminal of the first rectifying switch M11, the source terminal of the second rectifying switch M12, the source terminal of the third rectifying switch M21 and the source terminal of the fourth rectifying switch M22 are connected with each other and electrically connected with the output negative terminal Vo−.

As mentioned above, the primary winding assembly NP is wound around the first magnetic leg 513 from the first terminal to the second terminal along a first direction, and the primary winding assembly NP is wound around the second magnetic leg 514 from the first terminal to the second terminal along a second direction. The first direction and the second direction are opposite. For example, the first direction is a clockwise direction, and the second direction is a counterclockwise direction. In another embodiment, the first direction is the counterclockwise direction, and the second direction is the clockwise direction. The secondary windings are transferred through the corresponding communication portions. The winding method is not restricted as long as the relationships between associated windings are identical to those of the circuitry topology as shown in FIG. 2.

In this embodiment, the second terminal of the first secondary winding NS11, the first terminal of the second secondary winding NS12, the second terminal of the third secondary winding NS21 and the first terminal of the fourth secondary winding NS22 are electrically connected with each other. Particularly, the node between the second terminal of the first secondary winding NS11, the first terminal of the second secondary winding NS12, the second terminal of the third secondary winding NS21 and the first terminal of the fourth secondary winding NS22 is disposed within the middle region 515 of the magnetic core assembly 51. That is, the second terminal of the first secondary winding NS11, the first terminal of the second secondary winding NS12, the second terminal of the third secondary winding NS21 and the first terminal of the fourth secondary winding NS22 are connected to the node, and the node is further penetrated through the perforation 512*a* of the second magnetic cover 512.

In some other embodiments, the second terminal of the first secondary winding NS11, the first terminal of the second secondary winding NS12, the second terminal of the third secondary winding NS21 and the first terminal of the fourth secondary winding NS22 are electrically connected with each other. However, the node between the second terminal of the first secondary winding NS11, the first terminal of the second secondary winding NS12, the second terminal of the third secondary winding NS21 and the first terminal of the fourth secondary winding NS22 is located outside the magnetic core assembly 51. Particularly, the second terminal of the first secondary winding NS11, the first terminal of the second secondary winding NS12, the second terminal of the third secondary winding NS21 and the first terminal of the fourth secondary winding NS22 are penetrated through the perforation 512*a* of the second magnetic cover 512 and then connected with the node outside the magnetic core assembly 51 to form a common node.

Figure 1E:
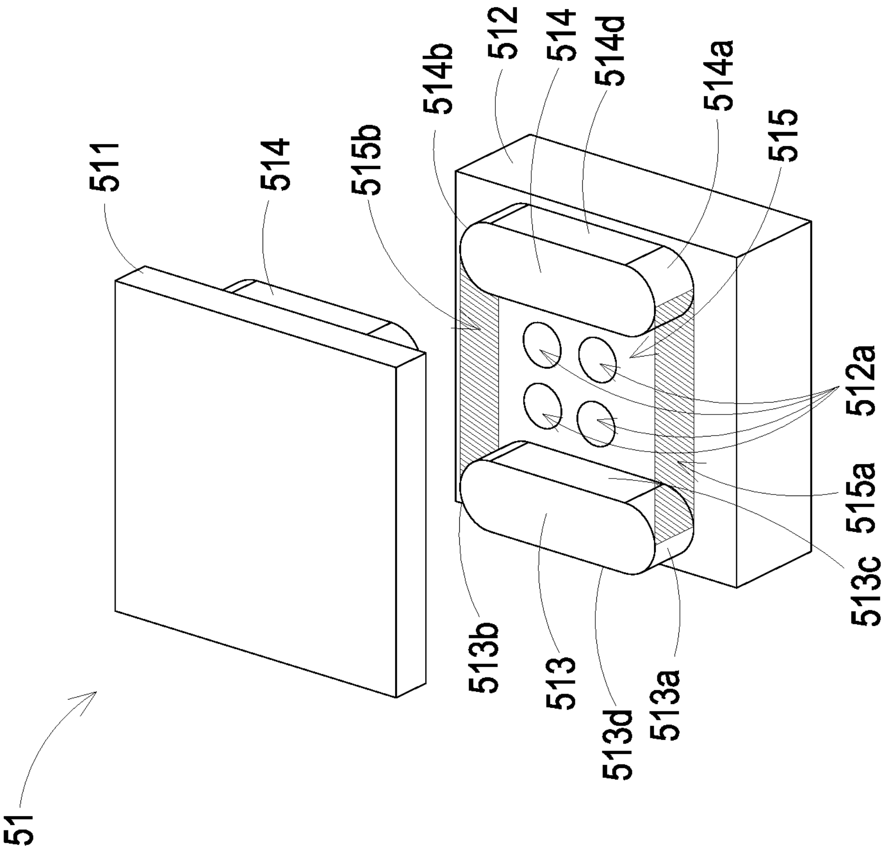
FIG. 1E is a schematic exploded view illustrating a variant example of the magnetic core assembly as shown in FIG. 1D.

In some other embodiments, the second terminal of the first secondary winding NS11, the first terminal of the second secondary winding NS12, the second terminal of the third secondary winding NS21 and the first terminal of the fourth secondary winding NS22 are penetrated through the perforation 512*a* of the second magnetic cover 512 and then connected with the corresponding circuits. It is noted that numerous modifications and alterations may be made while retaining the teachings of the disclosure. For example, the number of the perforation 512*a* is not limited one, the second magnetic cover 512 may include a plurality of perforations 512*a*. FIG. 1E is a schematic exploded view illustrating a variant example of the magnetic core assembly as shown in FIG. 1D. As shown in FIG. 1D, the second magnetic cover 512 has one perforation 512*a*. In comparison with FIG. 1D, the second magnetic cover 512 as shown in FIG. 1E has four perforations 512*a*. The second terminal of the first secondary winding NS11, the first terminal of the second secondary winding NS12, the second terminal of the third secondary winding NS21 and the first terminal of the fourth secondary winding NS22 are respectively penetrated through the corresponding perforations 512*a* of the second magnetic cover 512.

In an embodiment, a circular magnetic loop is formed in the second magnetic cover 512 of the magnetic core assembly 51. The circular magnetic loop surrounds the perforations 512*a* of the second magnetic cover 512. The circular magnetic loop is divided into a first sub-magnetic loop and a second sub-magnetic loop through the first magnetic leg 513 and the second magnetic leg 514. The first sub-magnetic loop is located near the first end 513*a* of the first magnetic leg 513 and the first end 514*a* of the second magnetic leg 514. The second sub-magnetic loop is located near the second end 513*b* of the first magnetic leg 513 and the second end 514*b* of the second magnetic leg 514.

As mentioned above, the first secondary winding NS11 is connected with the first rectifying switch M11, and the third secondary winding NS21 is connected with the third rectifying switch M21. Consequently, the amplitude and the phase of the terminal voltage across the two terminals of the first secondary winding NS11 and the amplitude and the phase of the terminal voltage across the two terminals of the third secondary winding NS21 are identical. Since the first sub-magnetic loop is clamped by the terminal voltage across the two terminals of the first secondary winding NS11 or the terminal voltage across the two terminals of the third secondary winding NS21, an AC magnetic flux corresponding to the first secondary winding NS11 or the third secondary winding NS21 is generated. In addition, the first secondary winding NS11, the first rectifying switch M11 and the output capacitor Co are collaboratively formed as a first closed loop, and the third secondary winding NS21, the third rectifying switch M21 and the output capacitor Co are collaboratively formed as a third closed loop. The first closed loop and the third closed loop pass through the perforations 512*a* of the second magnetic cover 512 to surround the first sub-magnetic loop.

As mentioned above, the second secondary winding NS12 is connected with the second rectifying switch M12, and the fourth secondary winding NS22 is connected with the fourth rectifying switch M22. Consequently, the amplitude and the phase of the terminal voltage across the two terminals of the second secondary winding NS12 and the amplitude and the phase of the terminal voltage across the two terminals of the fourth secondary winding NS22 are identical. Since the second sub-magnetic loop is clamped by the terminal voltage across the two terminals of the second secondary winding NS12 or the terminal voltage across the two terminals of the fourth secondary winding NS22, an AC magnetic flux corresponding to the second secondary winding NS12 or the fourth secondary winding NS22 is generated. In addition, the second secondary winding NS12, the second rectifying switch M12 and the output capacitor Co are collaboratively formed as a second closed loop, and the fourth secondary winding NS22, the fourth rectifying switch M22 and the output capacitor Co are collaboratively formed as a fourth closed loop. The second closed loop and the fourth closed loop pass through the perforations 512*a* of the second magnetic cover 512 to surround the second sub-magnetic loop.

The AC magnetic flux passing through the first sub-magnetic loop and the AC magnetic flux passing through the second sub-magnetic loop are cancelled out, and the remaining AC magnetic flux passes through the second magnetic cover 512, the first magnetic leg 513, the first magnetic cover 511 and the second magnetic leg 514 along a closed magnetic loop.

Moreover, in response to the DC currents flowing through the first secondary winding NS11, the second secondary winding NS12, the third secondary winding NS21 and the fourth secondary winding NS22, a circular magnetic flux is generated. The circular magnetic flux surrounds the perforation 512*a* of the second magnetic cover 512. In the circular magnetic loop, a first DC magnetic flux is generated in response to the DC currents flowing through the first secondary winding NS11 and the third secondary winding NS21, and a second DC magnetic flux is generated in response to the DC currents flowing through the second secondary winding NS12 and the fourth secondary winding NS22. The first DC magnetic flux and the second DC magnetic flux are equal. Since the circular magnetic flux in response to the DC currents flowing through the secondary windings NS11, NS12, NS21 and NS22 passes through the closed magnetic loop in the second magnetic cover 512, the DC magnetic fluxes on the first magnetic leg 513, the first magnetic cover 511 and the second magnetic leg 514 are zero.

By adjusting the magnetic resistance of the closed magnetic loop in the second magnetic cover 512, the magnitudes of the ripple currents and the saturation currents flowing through the secondary windings NS11, NS12, NS21 and NS22 are correspondingly adjusted. Due to the structure of the magnetic core assembly as shown in FIG. 1D and the winding method of the magnetic device as shown in FIG. 4, the size of the magnetic device is effectively reduced, and the power density of the power conversion module is enhanced.

As mentioned above, the magnetic core assembly 51 and the winding assembly 52 in the magnetic device 5 of the power conversion module 1 are specially designed. Consequently, the voltage reduction function of the transformer T is achieved. That is, the power conversion module 1 with the single-stage converter can achieve the voltage reduction function. In comparison with the conventional power conversion module with two stage converters, the magnetic device 5 of the power conversion module 1 of the present disclosure has reduced volume, enhanced operating efficiency and increased applications. Moreover, the coupled windings of each coupled winding pair are penetrated through the perforation of the second magnetic cover. Consequently, a DC magnetic flux is generated in the closed magnetic loop of the second magnetic cover 512 in response to the DC current flowing through each coupled winding pair. Since the DC magnetic fluxes on the first magnetic leg 513, the first magnetic cover 511 and the second magnetic leg 514 are zero, the volume of the magnetic device 5 is further reduced. Moreover, the second magnetic cover 512 is made of ferrite or iron powder with a distributed air gap. Consequently, the second magnetic cover 512 has larger inductance and satisfactory saturation properties. Under this circumstance, the output ripple current of the power conversion module 1 is decreased, and the peak current withstanding capability of the power conversion module 1 is enhanced.

Please refer to FIG. 1C again. The power conversion module 1 further includes a conductive post 44. The conductive post 44 is disposed on the center region of the second surface 42 of the circuit board 4. In addition, the conductive post 44 is aligned with the perforation 512*a* of the second magnetic cover 512. When the second magnetic cover 512 is attached on the second surface 42 of the circuit board 4, the conductive post 44 is penetrated through the perforation 512*a* of the second magnetic cover 512, and the conductive post 44 is protruded in the direction away from the circuit board 4. The conductive post 44 is electrically connected with the first secondary winding NS11, the second secondary winding NS12, the third secondary winding NS21 and the fourth secondary winding NS22 through electrical traces in the circuit board 4. Consequently, the first secondary winding NS11, the second secondary winding NS12, the third secondary winding NS21 and the fourth secondary winding NS22 can be penetrated through the perforation 512*a* of the second magnetic cover 512 through the conductive post 44.

Please refer to FIGS. 1A, 1B and 1C again. The power conversion module 1 further includes an encapsulation structure 6. Preferably but not exclusively, the encapsulation structure 6 is made of plastic molding material. The encapsulation structure 6 includes a plastic molding material layer (not shown), a covering surface 60*a* and a lateral wall 60*b*. The second surface 42 of the circuit board 4 and the components on the second surface 42 of the circuit board 4 are encapsulated by the plastic molding material layer. The lateral wall 60*b* is formed on the lateral surfaces of the plastic molding material layer through an electroplating process. The lateral wall 60*b* is arranged around the lateral surfaces of the plastic molding material layer and the lateral surfaces of the circuit board 4 between the first surface 41 and the second surface 42. In addition, the lateral wall 60*b* is protruded from the covering surface 60*a* and protruded in the direction toward the first surface 41 of the circuit board 4. The first surface 41 of the circuit board 4 and the components on the first surface 41 of the circuit board 4 are not covered by the encapsulation structure 6. In other words, the first surface 41 of the circuit board 4 and the components on the first surface 41 of the circuit board 4 are exposed to the surroundings. In addition, a positive input contact 61, a negative input contact 62, a positive output contact 63, two negative output contacts 64 and a plurality of signal contacts 65 are formed on the covering surface 60*a* of the encapsulation structure 6.

The positive input contact 61 is severed as the midpoint A of the switch bridge arm 21 as shown in FIG. 2. In addition, the positive input contact 61 is electrically connected with the corresponding circuit on the first surface 41 of the circuit board 4 through the lateral wall 60*b* of the encapsulation structure 6. The negative input contact 62 is served as the midpoint B of the capacitor bridge arm 22 as shown in FIG. 2. In addition, the negative input contact 62 is electrically connected with the corresponding circuit on the first surface 41 of the circuit board 4 through the lateral wall 60*b* of the encapsulation structure 6. The two negative output contacts 64 are served as two output negative terminals Vo− as shown in FIG. 2. One of the two negative output contacts 64 is located near the first rectifying switch M11 and the second rectifying switch M12. The other one of the two negative output contacts 64 is located near the third rectifying switch M21 and the fourth rectifying switch M22. In addition, the two negative output contacts 64 are electrically connected with the corresponding circuit on the first surface 41 of the circuit board 4 through the lateral wall 60*b* of the encapsulation structure 6. The positive output contact 63 is served as the output positive terminal Vo+ as shown in FIG. 2. In addition, the positive output contact 63 is arranged between the two negative output contacts 64 and connected with the conductive post 44 that is protruded outside the second magnetic cover 512. Consequently, the positive output contact 63 is electrically connected with the first secondary winding NS11, the second secondary winding NS12, the third secondary winding NS21 and the fourth secondary winding NS22 within the circuit board 4 through the conductive post 44. In some embodiments, the conductive post 44 is exposed outside the power conversion module 1 and served as a part of the positive output contact 63 of the encapsulation structure 6. The plurality of signal contacts 65 are used to transmit control signals (e.g., the PWM signals for controlling the first, second, third and fourth rectifying switches), detecting signals (e.g., the current sampling signal corresponding to the result of detecting a single rectifying circuit or the current sampling addition signal corresponding to the results of detecting two or more rectifying circuits), temperature signals or any other possible signals. In addition, the plurality of signal contacts 65 are electrically connected with the corresponding circuits on the first surface 41 of the circuit board 4 through the lateral wall 60*b* of the encapsulation structure 6. The positive input contact 61, the negative input contact 62 and the plurality of signal contacts 65 are located beside the positive output contact 63 and arranged between the two negative output contacts 64.

In some embodiments, both of the upper switch Q1 and the lower switch Q2 are disposed on the circuit board 4. The installation positions of the upper switch Q1 and the lower switch Q2 are determined according to the practical requirements. In this case, the positive input contact 61 is served as the input positive terminal Vin+, and the positive input contact 61 is electrically connected with the corresponding circuit on the first surface 41 of the circuit board 4 through the lateral wall 60*b* of the encapsulation structure 6. Moreover, the negative input contact 62 is served as the input negative terminal Vin− as shown in FIG. 2, and the negative input contact 62 is electrically connected with the corresponding circuit on the first surface 41 of the circuit board 4 through the lateral wall 60*b* of the encapsulation structure 6. The installations and functions of the positive output contact 63, the negative output contacts 64 and the plurality of signal contacts 65 are similar to those of the above embodiment, and not redundantly described herein.

Due to the lateral electroplated structure of the power conversion module 1, the conduction parts of the module and the internal circuits of the module can be electrically connected with each other. Consequently, the wiring structure in the circuit board is further reduced, the size of the power conversion module 1 is reduced, and the power density is enhanced.

The technical concepts of FIGS. 1A, 1B and 1C can be applied to other embodiments as long as the associated circuitry topology is modified.

In some embodiments, the encapsulation structure 6 is replaced by a printed circuit board and formed as a part of the circuit board 4. In this case, the components are not disposed on the second surface 42 of the circuit board 4 but embedded in the circuit board, and the conductive post 44 is replaced by a conductive hole or electrical trace in the circuit board. The lateral wall 60*b* is formed on the lateral surfaces of the circuit board through a lateral electroplating process. Since the encapsulation structure 6 is omitted, the production process of the power conversion module 1 is simplified, and the production cycle of the power conversion module 1 is shortened.

In an embodiment, the first rectifying switch M11, the second rectifying switch M12 and the driving circuits for driving the first rectifying switch M11 and the second rectifying switch M12 are integrated into a semiconductor package structure. Of course, the temperature measurement circuits for measuring the temperatures of the first rectifying switch M11 and the second rectifying switch M12 and/or the current detection circuits for detecting the currents flowing through the first rectifying switch M11 and the second rectifying switch M12 can be also integrated into the semiconductor package structure. Similarly, the third rectifying switch M21, the fourth rectifying switch M22 and the driving circuits for driving the third rectifying switch M21 and the fourth rectifying switch M22 are integrated into another semiconductor package structure. Of course, the temperature measurement circuits for measuring the temperatures of the third rectifying switch M21 and the fourth rectifying switch M22 and/or the current detection circuits for detecting the currents flowing through the third rectifying switch M21 and the fourth rectifying switch M22 can be also integrated into the semiconductor package structure. In this way, the number of components in the power conversion module 1 is reduced, and the wiring layout of the control circuit is simplified.

For succinctness, the components of the primary circuit 2 are not shown in FIGS. 1A, 1B, 1C and 1D. It is noted that the components of the primary circuit 2 can be disposed on any possible positions of the circuit board 4.

Figure 5:
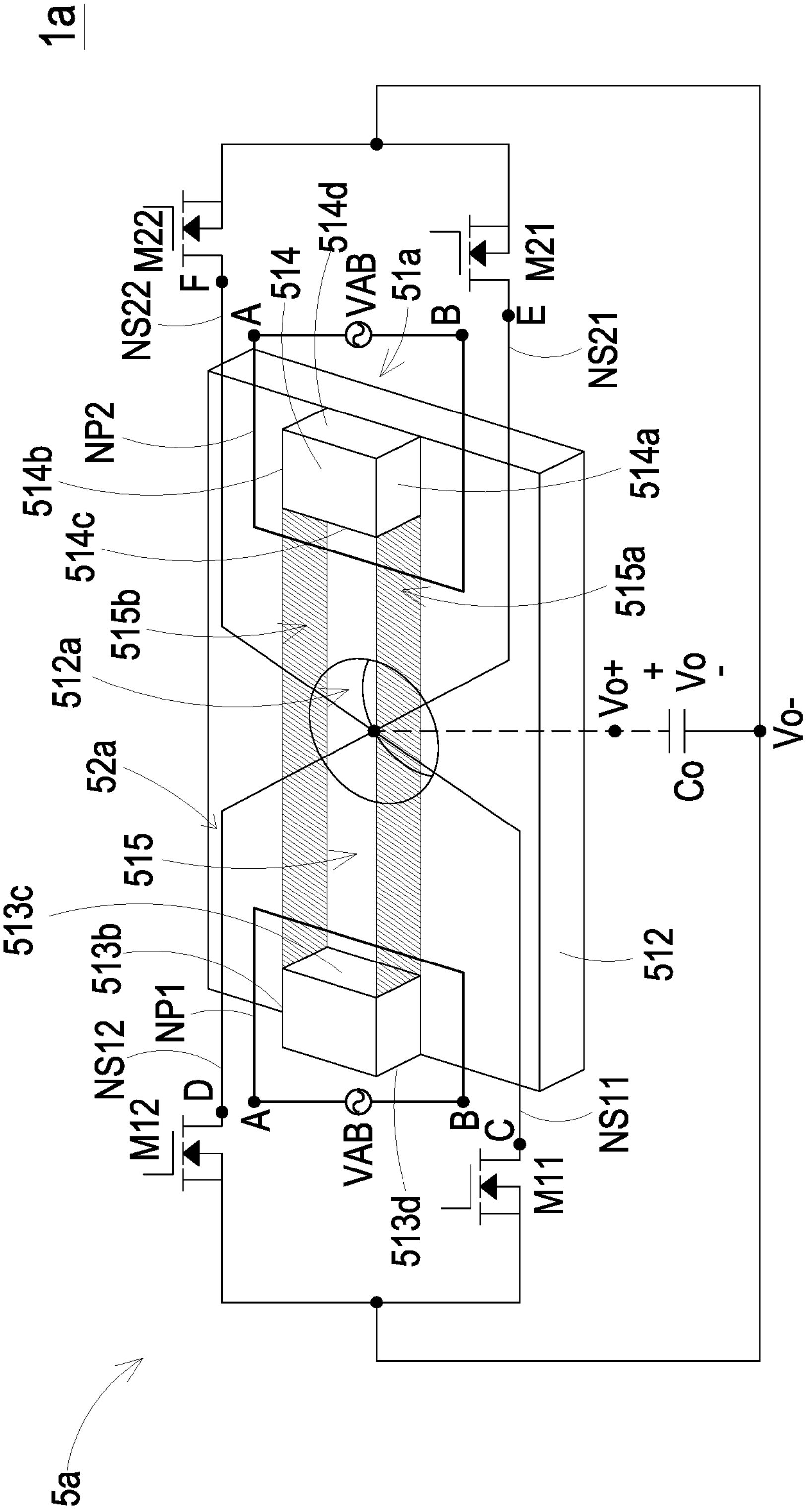
FIG. 5 schematically illustrates the magnetic core assembly and the winding assembly in the magnetic device of a power conversion module according to a second embodiment of the present disclosure, in which the first magnetic cover is not shown.

FIG. 5 schematically illustrates the magnetic core assembly and the winding assembly in the magnetic device of a power conversion module according to a second embodiment of the present disclosure, in which the first magnetic cover is not shown. The structure of the magnetic device 5*a* of the power conversion module 1*a* of this embodiment is similar to that of the magnetic device 5 as shown in FIG. 4. In comparison with FIG. 4, the winding method of the winding assembly 52 of the magnetic device 5*a* is distinguished. The winding methods of the secondary windings NS11, NS12, NS21 and NS22 are similar to those of FIG. 4, and not redundantly described herein.

In this embodiment, the first primary winding NP1 is wound around the first magnetic leg 513, and the second primary winding NP2 is wound around the second magnetic leg 514. In addition, the first primary winding NP1 and the second primary winding NP2 are connected with each other in parallel. The first terminal of the first primary winding NP1 and the first terminal of the second primary winding NP2 are connected with the midpoint A of the switch bridge arm 21. The second terminal of the first primary winding NP1 and the second terminal of the second primary winding NP2 are connected with the midpoint B of the capacitor bridge arm 22. The first primary winding NP1 is wound around the first magnetic leg 513 from the first terminal to the second terminal along a first direction. The second primary winding NP2 is wound around the second magnetic leg 514 from the first terminal to the second terminal along a second direction. The first direction and the second direction are opposite. For example, the first direction is a clockwise direction, and the second direction is a counterclockwise direction.

The first primary winding NP1 and the second primary winding NP2 are wound by using the above winding method. The amplitude of a first AC magnetic flux generated by the first primary winding NP1 and applied to the first magnetic leg 513 and the amplitude of a second AC magnetic flux generated by the second primary winding NP2 and applied to the second magnetic leg 514 are identical. However, the directions of the first AC magnetic flux and the second AC magnetic flux are opposite. Moreover, the first AC magnetic flux and the second AC magnetic flux pass through the first magnetic leg 513, the second magnetic leg 514, the first magnetic cover 511 and the second magnetic cover 512 to form a closed magnetic loop.

In some embodiments, the numbers of the primary windings and the secondary windings are decreased. Consequently, the power level outputted from the power conversion module is decreased.

Figure 6:
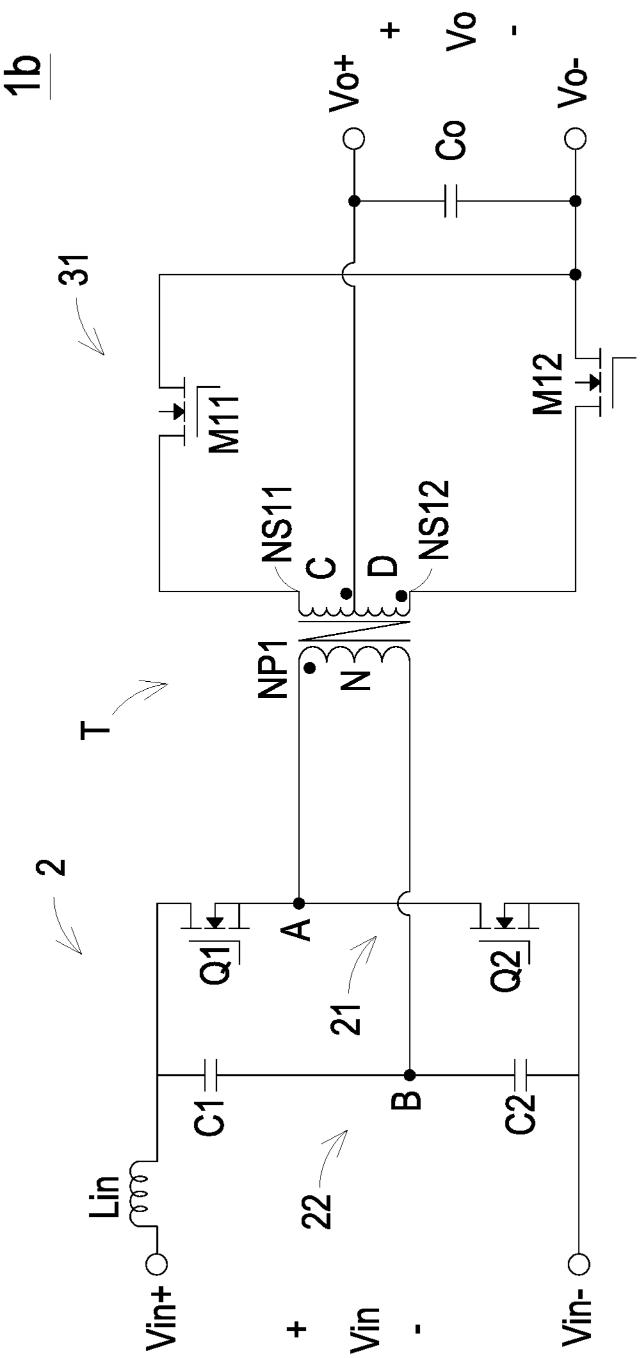
FIG. 6 is a schematic circuit diagram illustrating the circuitry topology of a power conversion module according to a third embodiment of the present disclosure.
Figure 7:
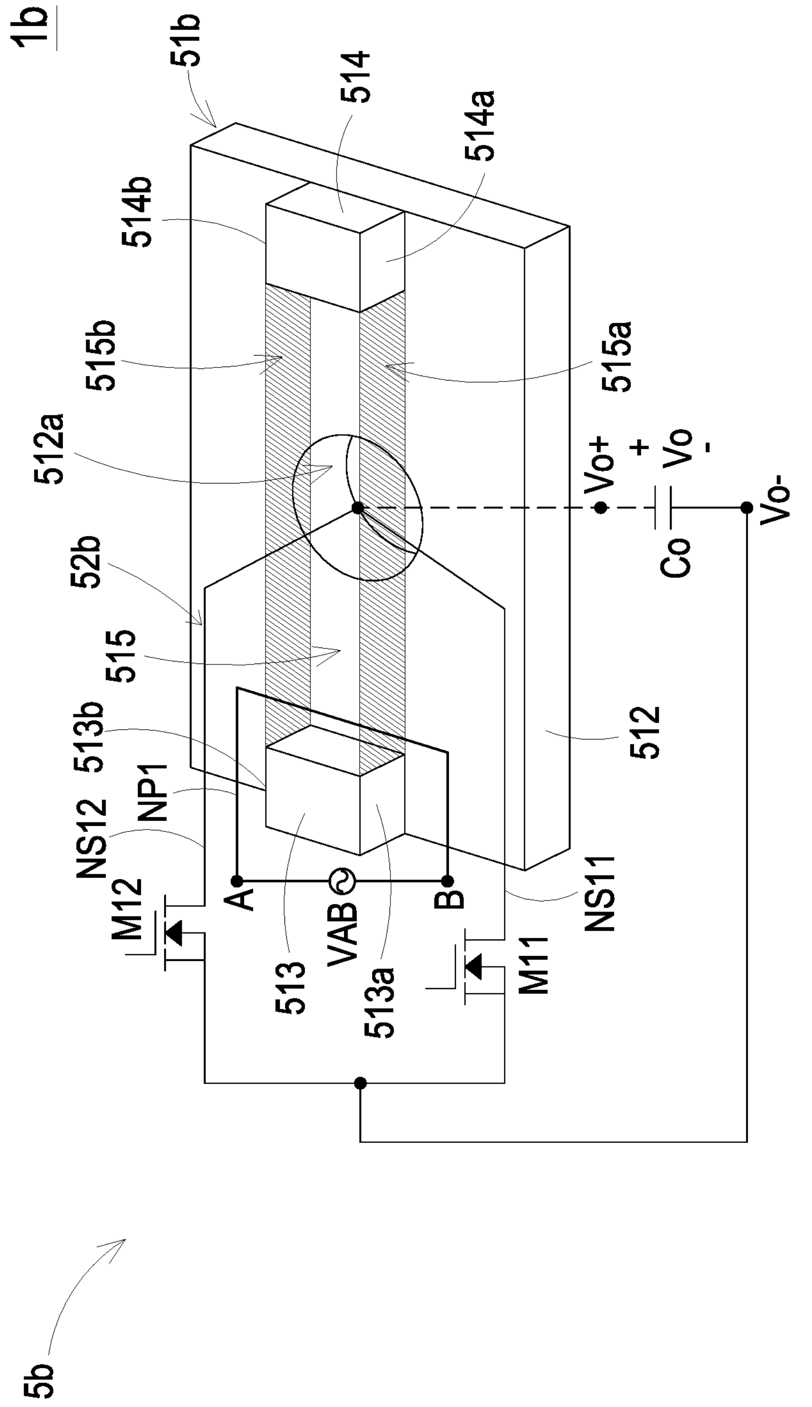
FIG. 7 schematically illustrates the magnetic core assembly and the winding assembly in the magnetic device of the power conversion module as shown in FIG. 6, in which the first magnetic cover is not shown.

Please refer to FIGS. 6 and 7. FIG. 6 is a schematic circuit diagram illustrating the circuitry topology of a power conversion module according to a third embodiment of the present disclosure. FIG. 7 schematically illustrates the magnetic core assembly and the winding assembly in the magnetic device of the power conversion module as shown in FIG. 6, in which the first magnetic cover is not shown.

The structure of the magnetic device 5*b* of the power conversion module 1*b* of this embodiment is similar to that of the magnetic device 5 as shown in FIG. 4. In comparison with FIG. 2, the power conversion module 1*b* of this embodiment includes a single primary winding (i.e., a first primary winding NP1) and two secondary windings (i.e., a first secondary winding NS11 and a second secondary winding NS12). The first terminal and the second terminal of the first primary winding NP1 are respectively connected with the midpoint A of the switch bridge arm 21 and the midpoint B of the capacitor bridge arm 22. The first primary winding NP1 is wound around the first magnetic leg 513. The installing method and the winding method of the first secondary winding NS11 and the second secondary winding NS12 are similar to those of the first embodiment, and not redundantly described herein. Since the number of components in the power conversion module 1*b* is reduced, the overall volume of the power conversion module 1*b* is largely reduced.

In some embodiments, the numbers of the primary windings and the secondary windings are increased. Consequently, the power conversion efficiency of the power conversion module is enhanced.

Figure 8:
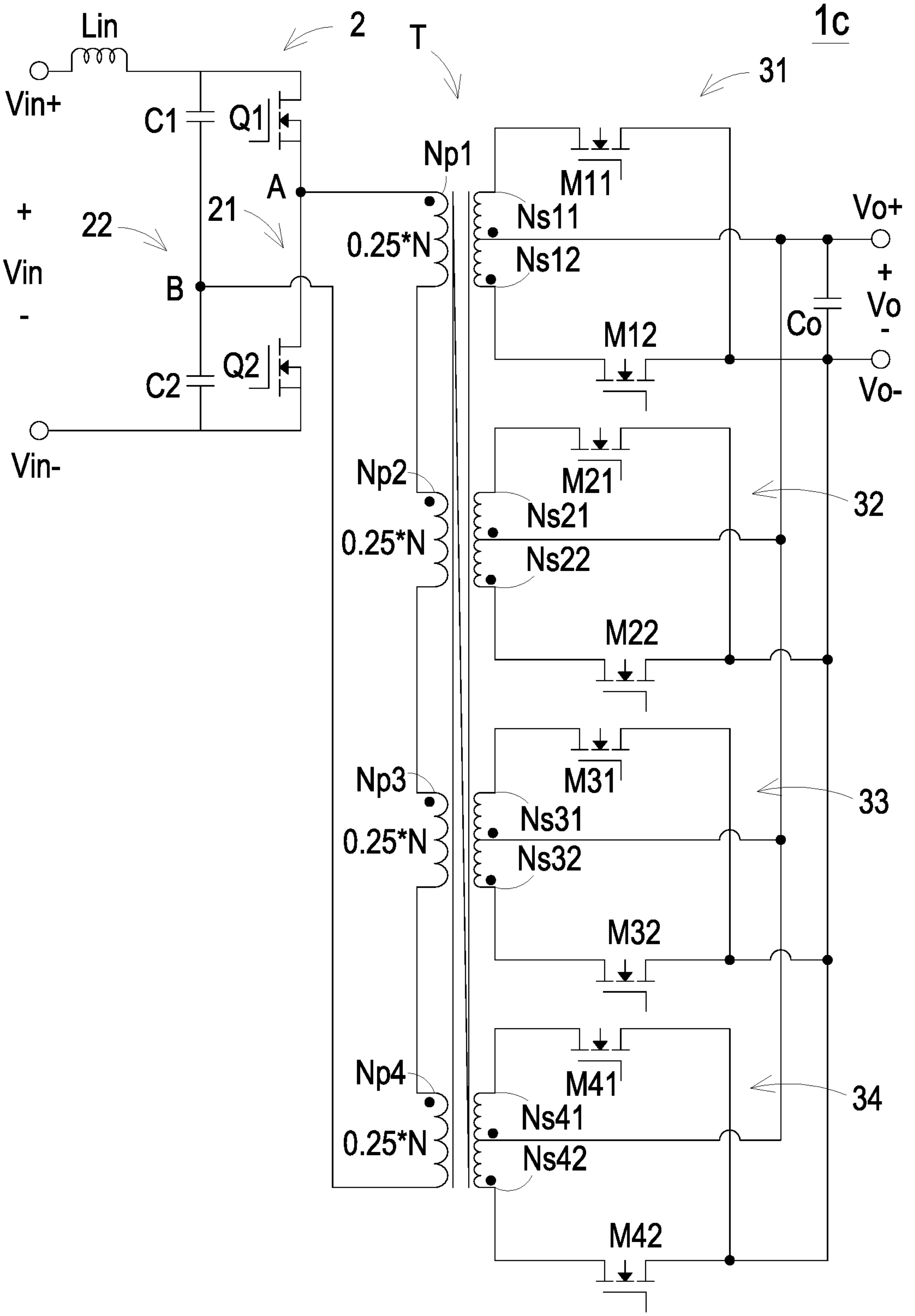
FIG. 8 is a schematic circuit diagram illustrating the circuitry topology of a power conversion module according to a fourth embodiment of the present disclosure.
Figure 9:
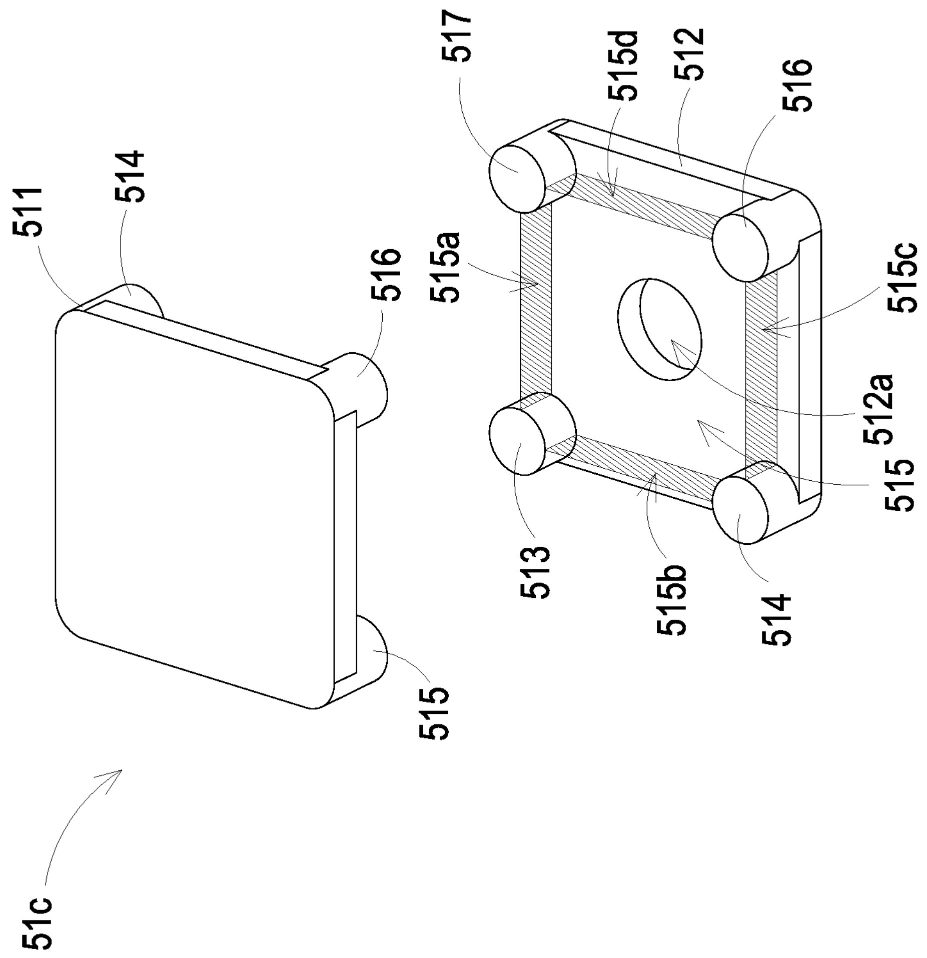
FIG. 9 is a schematic exploded view illustrating a magnetic core assembly of the power conversion module as shown in FIG. 8.
Figure 10:
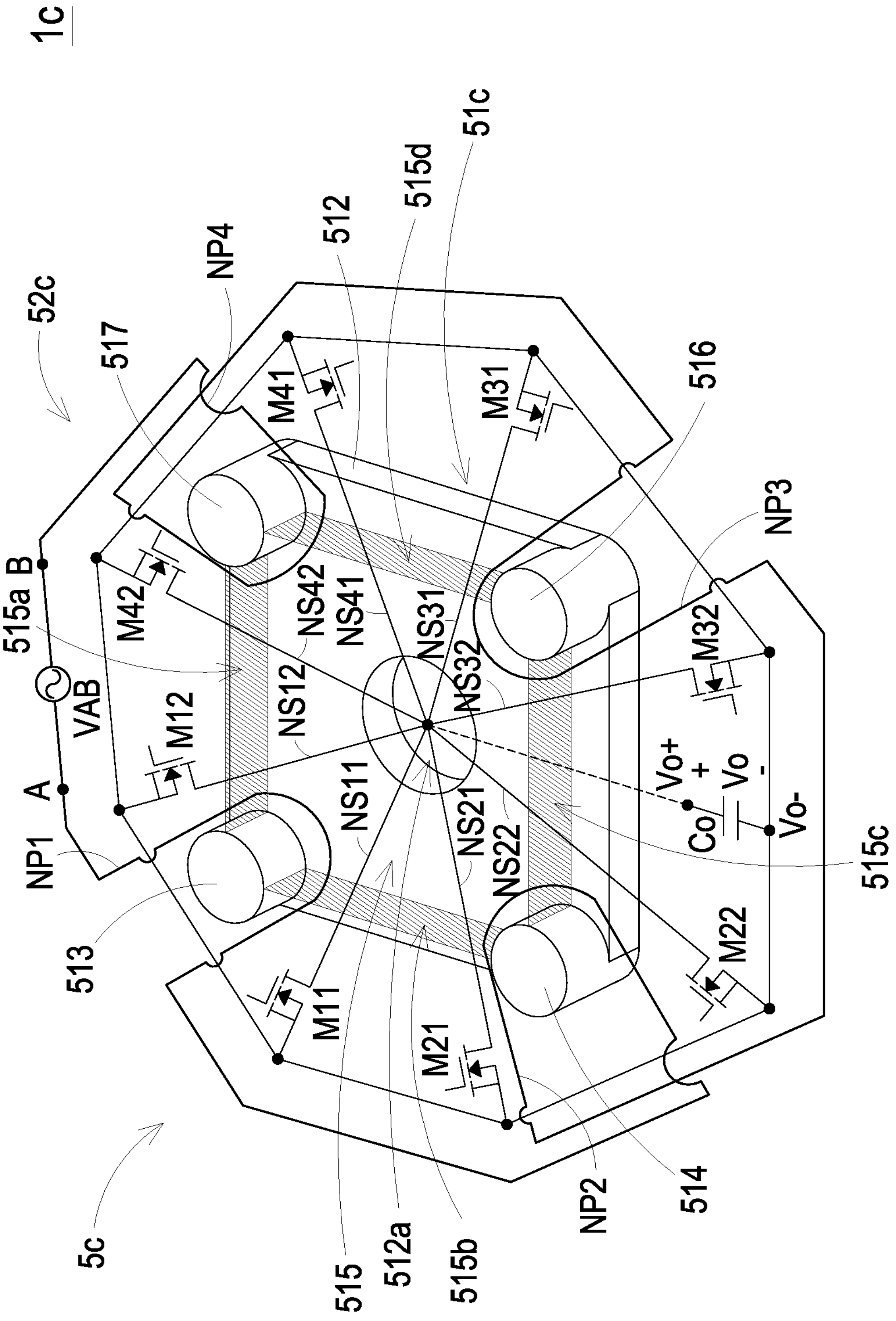
FIG. 10 schematically illustrates the magnetic core assembly and the winding assembly in the magnetic device of the power conversion module as shown in FIG. 8, in which the first magnetic cover is not shown.

Please refer to FIGS. 8, 9 and 10. FIG. 8 is a schematic circuit diagram illustrating the circuitry topology of a power conversion module according to a fourth embodiment of the present disclosure. FIG. 9 is a schematic exploded view illustrating a magnetic core assembly of the power conversion module as shown in FIG. 8. FIG. 10 schematically illustrates the magnetic core assembly and the winding assembly in the magnetic device of the power conversion module as shown in FIG. 8, in which the first magnetic cover is not shown.

Please refer to FIG. 8. The power conversion module 1*c* of this embodiment includes an input positive terminal Vin+, an input negative terminal Vin−, an output positive terminal Vo+, an output negative terminal Vo−, a switching circuit 2, a transformer T, a first rectifying circuit 31, a second rectifying circuit 32, a third rectifying circuit 33, a fourth rectifying circuit 34 and an output capacitor Co. The constituents and connecting relationship of the switching circuit 2 are similar to those of the first embodiment, and not redundantly described herein.

The transformer T includes a primary winding assembly NP, a first secondary winding NS11, a second secondary winding NS12, a third secondary winding NS21, a fourth secondary winding NS22, a fifth secondary winding NS31, a sixth secondary winding NS32, a seventh secondary winding NS41 and an eighth secondary winding NS42. The primary winding assembly NP includes a first primary winding NP1, a second primary winding NP2, a third primary winding NP3 and a fourth primary winding NP4.

As shown in FIG. 8, the first primary winding NP1, the second primary winding NP2, the third primary winding NP3 and the fourth primary winding NP4 are serially connected between the midpoint A of the switch bridge arm 21 and the midpoint B of the capacitor bridge arm 22. The first terminal of the first primary winding NP1 is electrically connected with the midpoint A of the switch bridge arm 21. The second terminal of the first primary winding NP1 is connected with the first terminal of the second primary winding NP2. The second terminal of the second primary winding NP2 is electrically connected with the first terminal of the third primary winding NP3. The second terminal of the third primary winding NP3 is electrically connected with the first terminal of the fourth primary winding NP4. The second terminal of the fourth primary winding NP4 is electrically connected with the midpoint B of the capacitor bridge arm 22.

The first terminal of the first primary winding NP1, the first terminal of the second primary winding NP2, the first terminal of the third primary winding NP3 and the first terminal of the fourth primary winding NP4 are common-polarity terminals (for example, dotted terminals). That is, the polarity of the first terminal of the first primary winding NP1, the polarity of the first terminal of the second primary winding NP2, the polarity of the first terminal of the third primary winding NP3 and the polarity of the first terminal of the fourth primary winding NP4 are identical. The second terminal of the first primary winding NP1, the second terminal of the second primary winding NP2, the second terminal of the third primary winding NP3 and the second terminal of the fourth primary winding NP4 are common-polarity terminals (for example, undotted terminals). That is, the polarity of the second terminal of the first primary winding NP1, the polarity of the second terminal of the second primary winding NP2, the polarity of the second terminal of the third primary winding NP3 and the polarity of the second terminal of the fourth primary winding NP4 are identical. The polarity of the second terminal of the first primary winding NP1 and the polarity of the first terminal of the second primary winding NP2 are opposite. The polarity of the second terminal of the second primary winding NP2 and the polarity of the first terminal of the third primary winding NP3 are opposite. The polarity of the second terminal of the third primary winding NP3 and the polarity of the first terminal of the fourth primary winding NP4 are opposite. The first primary winding NP1, the second primary winding NP2, the third primary winding NP3, the fourth primary winding NP4 and the switching circuit 2 are collaboratively formed as a primary circuit of the power conversion module 1*c*.

In an embodiment, the primary winding assembly NP has N turns, wherein N is a multiple of the number of the primary windings of the primary winding assembly NP. For example, in case that the primary winding assembly NP includes 4 primary windings, N is a multiple of 4. Moreover, the first primary winding NP1 has 0.25N turn, the second primary winding NP2 has 0.25N turn, the third primary winding NP3 has 0.25N turn, and the fourth primary winding NP4 has 0.25N turn.

The second terminal of the first secondary winding NS11 and the first terminal of the second secondary winding NS12 are electrically connected with each other. Moreover, the second terminal of the first secondary winding NS11 and the first terminal of the second secondary winding NS12 are electrically connected with the output positive terminal Vo+. The polarity of the second terminal of the first secondary winding NS11 and the polarity of the first terminal of the second secondary winding NS12 are opposite. The polarity of the first terminal of the first secondary winding NS11 and the polarity of the first terminal of the first primary winding NP1 (i.e., the dotted terminal) are opposite. The polarity of the second terminal of the second secondary winding NS12 and the polarity of the first terminal of the first primary winding NP1 (i.e., the dotted terminal) are identical. In an embodiment, each of the first secondary winding NS11 and the second secondary winding NS12 has one turn.

The first rectifying circuit 31 includes a first rectifying switch M11 and a second rectifying switch M12. The drain terminal of the first rectifying switch M11 is electrically connected with the first terminal of the first secondary winding NS11. The drain terminal of the second rectifying switch M12 is electrically connected with the second terminal of the second secondary winding NS12. The source terminal of the first rectifying switch M11 and the source terminal of the second rectifying switch M12 are connected with each other. Moreover, the source terminal of the first rectifying switch M11 and the source terminal of the second rectifying switch M12 are electrically connected with the output negative terminal Vo−. The first secondary winding NS11, the second secondary winding NS12 and the first rectifying circuit 31 are collaboratively formed as a first secondary circuit of the power conversion module 1*c*.

The second terminal of the third secondary winding NS21 and the first terminal of the fourth secondary winding NS22 are electrically connected with each other. Moreover, the second terminal of the third secondary winding NS21 and the first terminal of the fourth secondary winding NS22 are electrically connected with the output positive terminal Vo+.

The polarity of the second terminal of the third secondary winding NS21 and the polarity of the first terminal of the fourth secondary winding NS22 are opposite. The polarity of the first terminal of the third secondary winding NS21 and the polarity of the first terminal of the second primary winding NP2 (i.e., the dotted terminal) are opposite. The polarity of the second terminal of the fourth secondary winding NS22 and the polarity of the first terminal of the second primary winding NP2 (i.e., the dotted terminal) are identical. In an embodiment, each of the third secondary winding NS21 and the fourth secondary winding NS22 has one turn.

The second rectifying circuit 32 includes a third rectifying switch M21 and a fourth rectifying switch M22. The drain terminal of the third rectifying switch M21 is electrically connected with the first terminal of the third secondary winding NS21. The drain terminal of the fourth rectifying switch M22 is electrically connected with the second terminal of the fourth secondary winding NS22. The source terminal of the third rectifying switch M21 and the source terminal of the fourth rectifying switch M22 are connected with each other. Moreover, the source terminal of the third rectifying switch M21 and the source terminal of the fourth rectifying switch M22 are electrically connected with the output negative terminal Vo−. The third secondary winding NS21, the fourth secondary winding NS22 and the second rectifying circuit 32 are collaboratively formed as a second secondary circuit of the power conversion module 1*c*.

The second terminal of the fifth secondary winding NS31 and the first terminal of the sixth secondary winding NS32 are electrically connected with each other. Moreover, the second terminal of the fifth secondary winding NS31 and the first terminal of the fifth secondary winding NS32 are electrically connected with the output positive terminal Vo+. The polarity of the second terminal of the fifth secondary winding NS31 and the polarity of the first terminal of the sixth secondary winding NS32 are opposite. The polarity of the first terminal of the fifth secondary winding NS31 and the polarity of the first terminal of the third primary winding NP3 (i.e., the dotted terminal) are opposite. The polarity of the second terminal of the sixth secondary winding NS32 and the polarity of the first terminal of the third primary winding NP3 (i.e., the dotted terminal) are identical. In an embodiment, each of the fifth secondary winding NS31 and the sixth secondary winding NS32 has one turn.

The third rectifying circuit 33 includes a fifth rectifying switch M31 and a sixth rectifying switch M32. The drain terminal of the fifth rectifying switch M31 is electrically connected with the first terminal of the fifth secondary winding NS31. The drain terminal of the sixth rectifying switch M32 is electrically connected with the second terminal of the sixth secondary winding NS32. The source terminal of the fifth rectifying switch M31 and the source terminal of the sixth rectifying switch M32 are connected with each other. Moreover, the source terminal of the fifth rectifying switch M31 and the source terminal of the sixth rectifying switch M32 are electrically connected with the output negative terminal Vo−. The fifth secondary winding NS31, the sixth secondary winding NS32 and the third rectifying circuit 33 are collaboratively formed as a third secondary circuit of the power conversion module 1*c*.

The second terminal of the seventh secondary winding NS41 and the first terminal of the eighth secondary winding NS42 are electrically connected with each other. Moreover, the second terminal of the seventh secondary winding NS41 and the first terminal of the eighth secondary winding NS42 are electrically connected with the output positive terminal Vo+. The polarity of the second terminal of the seventh secondary winding NS41 and the polarity of the first terminal of the eighth secondary winding NS42 are opposite. The polarity of the first terminal of the seventh secondary winding NS41 and the polarity of the first terminal of the fourth primary winding NP4 (i.e., the dotted terminal) are opposite. The polarity of the second terminal of the eighth secondary winding NS42 and the polarity of the first terminal of the fourth primary winding NP4 (i.e., the dotted terminal) are identical. In an embodiment, each of the seventh secondary winding NS41 and the eighth secondary winding NS42 has one turn.

The fourth rectifying circuit 34 includes a seventh rectifying switch M41 and an eighth rectifying switch M42. The drain terminal of the seventh rectifying switch M41 is electrically connected with the first terminal of the seventh secondary winding NS41. The drain terminal of the eighth rectifying switch M42 is electrically connected with the second terminal of the eighth secondary winding NS42. The source terminal of the seventh rectifying switch M41 and the source terminal of the eighth rectifying switch M42 are connected with each other. Moreover, the source terminal of the seventh rectifying switch M41 and the source terminal of the eighth rectifying switch M42 are electrically connected with the output negative terminal Vo−. The seventh secondary winding NS41, the eighth secondary winding NS42 and the fourth rectifying circuit 34 are collaboratively formed as a fourth secondary circuit of the power conversion module 1*c*.

The method of controlling associated switches is similar to that of the first embodiment. In the power conversion module 1*c* of this embodiment, the first rectifying switch M11, the third rectifying switch M21, the fifth rectifying switch M31 and the seventh rectifying switch M41 receive the same driving signal. The on/off states of these switches are controlled according to this driving signal. As mentioned above, the first secondary winding NS11 is connected with the first rectifying switch M11, the third secondary winding NS21 is connected with the third rectifying switch M21, the fifth secondary winding NS31 is connected with the fifth rectifying switch M31, and the seventh secondary winding NS41 is connected with the seventh rectifying switch M41. Consequently, the frequency and the phase of the terminal voltage across the two terminals of the first secondary winding NS11, the frequency and the phase of the terminal voltage across the two terminals of the third secondary winding NS21, the frequency and the phase of the terminal voltage across the two terminals of the fifth secondary winding NS31, and the frequency and the phase of the terminal voltage across the two terminals of the seventh secondary winding NS41 are identical.

In the power conversion module 1*c* of this embodiment, the second rectifying switch M12, the fourth rectifying switch M22, the sixth rectifying switch M32 and the eighth rectifying switch M42 receive the same driving signal. The on/off states of these switches are controlled according to this driving signal. As mentioned above, the second secondary winding NS12 is connected with the second rectifying switch M12, the fourth secondary winding NS22 is connected with the fourth rectifying switch M22, the sixth secondary winding NS32 is connected with the sixth rectifying switch M32, and the eighth secondary winding NS42 is connected with the eighth rectifying switch M42. Consequently, the frequency and the phase of the terminal voltage across the two terminals of the second secondary winding NS12, the frequency and the phase of the terminal voltage across the two terminals of the fourth secondary winding NS22, the frequency and the phase of the terminal voltage across the two terminals of the sixth secondary winding NS32, and the frequency and the phase of the terminal voltage across the two terminals of the eighth secondary winding NS42 are identical.

As shown in FIG. 9, the transformer T in the power conversion module 1*c* of this embodiment further includes a magnetic core assembly 51*c*. In comparison with the magnetic core assembly 51 of FIG. 1D, the magnetic core assembly 51*c* of this embodiment has more magnetic legs. In the power conversion module 1*c*, the magnetic core assembly 51*c* includes a first magnetic leg 513, a second magnetic leg 514, a third magnetic leg 516 and a fourth magnetic leg 517. The first magnetic leg 513, the second magnetic leg 514, the third magnetic leg 516 and the fourth magnetic leg 517 are connected between the first magnetic cover 511 and the second magnetic cover 512. In addition, these magnetic legs are arranged around the perforation 512*a* of the second magnetic cover 512. In an embodiment, each of the first magnetic cover 511 and the second magnetic cover 512 has a rectangular structure with two diagonal lines. The first magnetic leg 513 and the third magnetic leg 516 are respectively located at two ends of the first diagonal line of the second magnetic cover 512. The second magnetic leg 514 and the fourth magnetic leg 517 are respectively located at two ends of the second diagonal line of the second magnetic cover 512.

In this embodiment, a middle region 515 is defined by the magnetic cover 511, the first magnetic leg 513, the second magnetic leg 514, the third magnetic leg 516, the fourth magnetic leg 517 and the second magnetic cover 512 collaboratively. That is, the middle region 515 is a region surrounded by the first magnetic leg 513, the second magnetic leg 514, the third magnetic leg 516 and the fourth magnetic leg 517.

It is noted that the shapes of the first magnetic cover 511 and the second magnetic cover 512 are not restricted. However, the line passing through the first magnetic leg 513 and the third magnetic leg 516 and the line passing through the fourth magnetic leg 514 and the fourth magnetic leg 517 intersect each other. Moreover, the projection area of the intersection lies in the perforation 512*a* of the second magnetic leg 512.

The first magnetic cover 511 is attached on the first surface 41 of the circuit board 4. The second magnetic cover 512 is attached on the second surface 42 of the circuit board 4. The first magnetic leg 513, the second magnetic leg 514, the third magnetic leg 516 and the fourth magnetic leg 517 are inserted in the circuit board 4. Consequently, a portion of the circuit board 4 is accommodated within the middle region 515. The middle region 515 is in communication with the perforation 512*a* of the second magnetic cover 512.

The middle region 515 further includes a first communication portion 515*a*, a second communication portion 515*b*, a third communication portion 515*c* and a fourth communication portion 515*d*. The first communication portion 515*a* is arranged between the first magnetic leg 513 and the fourth magnetic leg 517. The second communication portion 515*b* is arranged between the first magnetic leg 513 and the second magnetic leg 514. The third communication portion 515*c* is arranged between the second magnetic leg 514 and the third magnetic leg 516. The fourth communication portion 515*d* is arranged between the third magnetic leg 516 and the fourth magnetic leg 517. That is, the first communication portion 515*a* and the third communication portion 515*c* are located at two opposite sides of the middle region 515, and the second communication portion 515*b* and the fourth communication portion 515*d* are located at two opposite sides of the middle region 515. The middle region 515 is in communication with the external portion of the magnetic core assembly 51 through the first communication portion 515*a*, the second communication portion 515*b*, the third communication portion 515*c* and the fourth communication portion 515*d*.

The method of winding the winding assembly 52*c* of the magnetic device 5*c* will be described with reference to FIG. 10. For succinctness, the first magnetic cover 511 of the magnetic core assembly 51 is not shown. That is, only the second magnetic cover 512 of the magnetic core assembly 51*c* is shown in FIG. 10. As shown in FIG. 10, the winding assembly 52*c* includes the first primary winding assembly NP1, the second primary winding NP2, the third primary winding NP3, the fourth primary winding NP4, the first secondary winding NS11, the second secondary winding NS12, the third secondary winding NS21, the fourth secondary winding NS22, the fifth secondary winding NS31, the sixth secondary winding NS32, the seventh secondary winding NS41 and the eighth secondary winding NS42.

Please also refer to FIG. 8. The first terminal of the first primary winding NP1 is connected with the midpoint A of the switch bridge arm 21, and located outside the magnetic core assembly 51*c*. The first primary winding NP1 is transferred through the first communication portion 515*a*, the middle region 515 and the second communication portion 515*b*. The first terminal of the first primary winding NP1 is located outside the magnetic core assembly 51*c* and located near the first communication portion 515*a*. The first primary winding NP1 is wound around the first magnetic leg 513. The second terminal of the first primary winding NP1 is located outside the magnetic core assembly 51*c* and located near the second communication portion 515*b*. The first terminal of the second primary winding NP2 is connected with the second terminal of the first primary winding NP1. The second primary winding NP2 is transferred through the third communication portion 515*c*, the middle region 515 and the second communication portion 515*b*. The first terminal of the second primary winding NP2 is located outside the magnetic core assembly 51*c* and located near the third communication portion 515*c*. The second primary winding NP2 is wound around the second magnetic leg 514. The second terminal of the second primary winding NP2 is located outside the magnetic core assembly 51*c* and located near the second communication portion 515*b*. The first terminal of the third primary winding NP3 is connected with the second terminal of the second primary winding NP2. The third primary winding NP3 is transferred through the third communication portion 515*c*, the middle region 515 and the fourth communication portion 515*d*. The first terminal of the third primary winding NP3 is located outside the magnetic core assembly 51*c* and located near the third communication portion 515*c*. The third primary winding NP3 is wound around the third magnetic leg 516. The second terminal of the third primary winding NP3 is located outside the magnetic core assembly 51*c* and located near the fourth communication portion 515*d*. The first terminal of the fourth primary winding NP4 is connected with the second terminal of the third primary winding NP3. The fourth primary winding NP4 is transferred through the first communication portion 515*a*, the middle region 515 and the fourth communication portion 515*d*. The first terminal of the fourth primary winding NP4 is located outside the magnetic core assembly 51*c* and located near the first communication portion 515*a*. The fourth primary winding NP4 is wound around the fourth magnetic leg 517. The second terminal of the fourth primary winding NP4 is located outside the magnetic core assembly 51*c* and located near the fourth communication portion 515*d*. As shown in FIG. 8, the second terminal of the fourth primary winding NP4 is also connected with the midpoint B of the capacitor bridge arm 22.

In this embodiment, the first primary winding NP1 is wound around the first magnetic leg 513 from the first terminal to the second terminal along a first direction. The second primary winding NP2 is wound around the second magnetic leg 514 from the first terminal to the second terminal along a second direction. The third primary winding NP3 is wound around the third magnetic leg 516 from the first terminal to the second terminal along the first direction. The fourth primary winding NP4 is wound around the fourth magnetic leg 517 from the first terminal to the second terminal along the second direction. The first direction and the second direction are opposite. For example, the first direction is a clockwise direction, and the second direction is a counterclockwise direction.

The first primary winding NP1, the second primary winding NP2, the third primary winding NP3 and the fourth primary winding NP4 are wound by using the above winding method. The amplitude of a first AC magnetic flux generated by the primary winding assembly NP and applied to the first magnetic leg 513 and the amplitude of a third AC magnetic flux generated by the primary winding assembly NP and applied to the third magnetic leg 516 are identical. The directions of the first AC magnetic flux and the third AC magnetic flux are identical. The amplitude of a second AC magnetic flux generated by the primary winding assembly NP and applied to the second magnetic leg 514 and the amplitude of a fourth AC magnetic flux generated by the primary winding assembly NP and applied to the fourth magnetic leg 517 are identical. The directions of the second AC magnetic flux and the fourth AC magnetic flux are identical. However, the direction of the first AC magnetic flux (or the third AC magnetic flux) and the direction of the second AC magnetic flux (or the fourth AC magnetic flux) are opposite. Consequently, the AC magnetic fluxes on every two adjacent magnetic legs have the same amplitude but opposite directions. That is, the AC magnetic fluxes on the first magnetic leg 513 and the second magnetic leg 514 have the same amplitude but opposite directions, the AC magnetic fluxes on the second magnetic leg 514 and the third magnetic leg 516 have the same amplitude but opposite directions, the AC magnetic fluxes on the third magnetic leg 516 and the fourth magnetic leg 517 have the same amplitude but opposite directions, and the AC magnetic fluxes on the fourth magnetic leg 517 and the first magnetic leg 513 have the same amplitude but opposite directions. Moreover, the first, second, third and fourth AC magnetic fluxes pass through the first magnetic leg 513, the second magnetic leg 514, the third magnetic leg 516, the fourth magnetic leg 517, the first magnetic cover 511 and the second magnetic cover 512 to form a closed magnetic loop. Certainly, the winding method is not limited to the above-mentioned winding method and can be adjusted according to the practical requirements.

As shown in FIG. 10, the first secondary winding NS11, the second secondary winding NS12, the first rectifying switch M11 and the second rectifying switch M12 are collaboratively formed as a first secondary circuit of the power conversion module 1*c*.

The first terminal of the first secondary winding NS11 is located outside the magnetic core assembly 51*c* and located near the second communication portion 515*b*. The first terminal of the first secondary winding NS11 is connected with the drain terminal of the first rectifying switch M11. The second terminal of the first secondary winding NS11 is located at the middle region 515 and penetrated through the perforation 512*a* of the second magnetic cover 512. In addition, the second terminal of the first secondary winding NS11 is electrically connected with the output positive terminal Vo+ located outside the magnetic core assembly 51*c*. That is, the first secondary winding NS11 is transferred through the second communication portion 515*b*, and a portion of the first secondary winding NS11 is penetrated through the perforation 512*a*.

The second terminal of the second secondary winding NS12 is located outside the magnetic core assembly 51*c* and located near the first communication portion 515*a*. The second terminal of the second secondary winding NS12 is connected with the drain terminal of the second rectifying switch M12. The first terminal of the second secondary winding NS12 is located at the middle region 515 and penetrated through the perforation 512*a* of the second magnetic cover 512. In addition, the first terminal of the second secondary winding NS12 is electrically connected with the output positive terminal Vo+ located outside the magnetic core assembly 51*c*. That is, the second secondary winding NS12 is transferred through the first communication portion 515*a*, and a portion of the second secondary winding NS12 is penetrated through the perforation 512*a*. Moreover, the first secondary winding NS11 and the second secondary winding NS12 are collaboratively formed as a first coupled winding pair.

The third secondary winding NS21, the fourth secondary winding NS22, the third rectifying switch M21 and the fourth rectifying switch M22 are collaboratively formed as a second secondary circuit of power conversion module 1*c*.

The first terminal of the third secondary winding NS21 is located outside the magnetic core assembly 51*c* and located near the second communication portion 515*b*. The first terminal of the third secondary winding NS21 is connected with the drain terminal of the third rectifying switch M21. The second terminal of the third secondary winding NS21 is located at the middle region 515 and penetrated through the perforation 512*a* of the second magnetic cover 512. In addition, the second terminal of the third secondary winding NS21 is electrically connected with the output positive terminal Vo+ located outside the magnetic core assembly 51*c*. That is, the third secondary winding NS21 is transferred through the second communication portion 515*b*, and a portion of the third secondary winding NS21 is penetrated through the perforation 512*a*.

The second terminal of the fourth secondary winding NS22 is located outside the magnetic core assembly 51*c* and located near the third communication portion 515*c*. The second terminal of the fourth secondary winding NS22 is connected with the drain terminal of the fourth rectifying switch M22. The first terminal of the fourth secondary winding NS22 is located at the middle region 515 and penetrated through the perforation 512*a* of the second magnetic cover 512. In addition, the first terminal of the fourth secondary winding NS22 is electrically connected with the output positive terminal Vo+ located outside the magnetic core assembly 51*c*. That is, the fourth secondary winding NS22 is transferred through the third communication portion 515*c*, and a portion of the fourth secondary winding NS22 is penetrated through the perforation 512*a*. Moreover, the third secondary winding NS21 and the fourth secondary winding NS22 are collaboratively formed as a second coupled winding pair.

The fifth secondary winding NS31, the sixth secondary winding NS32, the fifth rectifying switch M31 and the sixth rectifying switch M32 are collaboratively formed as a third secondary circuit of power conversion module 1*c*.

The first terminal of the fifth secondary winding NS31 is located outside the magnetic core assembly 51*c* and located near the fourth communication portion 515*d*. The first terminal of the fifth secondary winding NS31 is connected with the drain terminal of the fifth rectifying switch M31. The second terminal of the fifth secondary winding NS31 is located at the middle region 515 and penetrated through the perforation 512*a* of the second magnetic cover 512. In addition, the second terminal of the fifth secondary winding NS31 is electrically connected with the output positive terminal Vo+ located outside the magnetic core assembly 51*c*. That is, the fifth secondary winding NS31 is transferred through the fourth communication portion 515*d*, and a portion of the fifth secondary winding NS31 is penetrated through the perforation 512*a* of the second magnetic cover 512.

The second terminal of the sixth secondary winding NS32 is located outside the magnetic core assembly 51*c* and located near the third communication portion 515*c*. The second terminal of the sixth secondary winding NS32 is connected with the drain terminal of the sixth rectifying switch M32. The first terminal of the sixth secondary winding NS32 is located at the middle region 515 and penetrated through the perforation 512*a* of the second magnetic cover 512. In addition, the first terminal of the sixth secondary winding NS32 is electrically connected with the output positive terminal Vo+ located outside the magnetic core assembly 51*c*. That is, the sixth secondary winding NS32 is transferred through the third communication portion 515*c*, and a portion of the sixth secondary winding NS32 is penetrated through the perforation 512*a* of the second magnetic cover 512. Moreover, the fifth secondary winding NS31 and the sixth secondary winding NS32 are collaboratively formed as a third coupled winding pair.

The seventh secondary winding NS41, the eighth secondary winding NS42, the seventh rectifying switch M41 and the eighth rectifying switch M42 are collaboratively formed as a fourth secondary circuit of power conversion module 1*c*.

The first terminal of the seventh secondary winding NS41 is located outside the magnetic core assembly 51*c* and located near the fourth communication portion 515*d*. The first terminal of the seventh secondary winding NS41 is connected with the drain terminal of the seventh rectifying switch M41. The second terminal of the seventh secondary winding NS41 is located at the middle region 515 and penetrated through the perforation 512*a* of the second magnetic cover 512. In addition, the second terminal of the seventh secondary winding NS41 is electrically connected with the output positive terminal Vo+ located outside the magnetic core assembly 51*c*. That is, the seventh secondary winding NS41 is transferred through the fourth communication portion 515*d*, and a portion of the seventh secondary winding NS41 is penetrated through the perforation 512*a* of the second magnetic cover 512.

The second terminal of the eighth secondary winding NS42 is located outside the magnetic core assembly 51*c* and located near the first communication portion 515*a*. The second terminal of the eighth secondary winding NS42 is connected with the drain terminal of the eighth rectifying switch M42. The first terminal of the eighth secondary winding NS42 is located at the middle region 515 and penetrated through the perforation 512*a* of the second magnetic cover 512. In addition, the first terminal of the eighth secondary winding NS42 is electrically connected with the output positive terminal Vo+ located outside the magnetic core assembly 51*c*. That is, the eighth secondary winding NS42 is transferred through the first communication portion 515*a*, and a portion of the eighth secondary winding NS42 is penetrated through the perforation 512*a* of the second magnetic cover 512. Moreover, the seventh secondary winding NS41 and the eighth secondary winding NS42 are collaboratively formed as a fourth coupled winding pair.

The source terminal of the first rectifying switch M11, the source terminal of the second rectifying switch M12, the source terminal of the third rectifying switch M21, the source terminal of the fourth rectifying switch M22, the source terminal of the fifth rectifying switch M31, the source terminal of the sixth rectifying switch M32, the source terminal of the seventh rectifying switch M41 and the source terminal of the eighth rectifying switch M42 are connected with each other and electrically connected with the output negative terminal Vo−. The output negative terminal Vo− is located outside the magnetic core assembly 51*c*.

By using the above winding method, a circular magnetic loop is formed in the second magnetic cover 512 of the magnetic core assembly 51*a*. The circular magnetic loop surrounds the perforations 512*a* of the second magnetic cover 512. The circular magnetic loop is divided into a first sub-magnetic loop, a second sub-magnetic loop, a third sub-magnetic loop and a fourth sub-magnetic loop. The first sub-magnetic loop is arranged between the first magnetic leg 513 and the second magnetic leg 514. The second sub-magnetic loop is arranged between the second magnetic leg 514 and the third magnetic leg 516. The third sub-magnetic loop is arranged between the third magnetic leg 516 and the fourth magnetic leg 517. The fourth sub-magnetic loop is arranged between the fourth magnetic leg 517 and the first magnetic leg 513.

The first secondary winding NS11, the first rectifying switch M11 and the output capacitor Co are collaboratively formed as a first closed loop. The third secondary winding NS21, the third rectifying switch M21 and the output capacitor Co are collaboratively formed as a third closed loop. The first closed loop and the third closed loop pass through the perforations 512*a* of the second magnetic cover 512 to surround the first sub-magnetic loop. The fourth secondary winding NS22, the fourth rectifying switch M22 and the output capacitor Co are collaboratively formed as a fourth closed loop. The sixth secondary winding NS32, the sixth rectifying switch M32 and the output capacitor Co are collaboratively formed as a sixth closed loop. The fourth closed loop and the sixth closed loop pass through the perforations 512*a* of the second magnetic cover 512 to surround the second sub-magnetic loop. The fifth secondary winding NS31, the fifth rectifying switch M31 and the output capacitor Co are collaboratively formed as a fifth closed loop. The seventh secondary winding NS41, the seventh rectifying switch M41 and the output capacitor Co are collaboratively formed as a seventh closed loop. The fifth closed loop and the seventh closed loop pass through the perforations 512*a* of the second magnetic cover 512 to surround the third sub-magnetic loop. The second secondary winding NS12, the second rectifying switch M12 and the output capacitor Co are collaboratively formed as a second closed loop. The eighth secondary winding NS42, the eighth rectifying switch M42 and the output capacitor Co are collaboratively formed as an eighth closed loop. The second closed loop and the eighth closed loop pass through the perforations 512*a* of the second magnetic cover 512 to surround the fourth sub-magnetic loop.

Since the first sub-magnetic loop is clamped by the terminal voltage across the two terminals of the first secondary winding NS11 or the terminal voltage across the two terminals of the third secondary winding NS21, an AC magnetic flux corresponding to the first secondary winding NS11 or the third secondary winding NS21 is generated. Similarly, since the second sub-magnetic loop is clamped by the terminal voltage across the two terminals of the fourth secondary winding NS22 or the terminal voltage across the two terminals of the sixth secondary winding NS32, an AC magnetic flux corresponding to the fourth secondary winding NS22 or the sixth secondary winding NS32 is generated. Similarly, since the third sub-magnetic loop is clamped by the terminal voltage across the two terminals of the fifth secondary winding NS31 or the terminal voltage across the two terminals of the seventh secondary winding NS41, an AC magnetic flux corresponding to the fifth secondary winding NS31 or the seventh secondary winding NS41 is generated. Similarly, since the fourth sub-magnetic loop is clamped by the terminal voltage across the two terminals of the second secondary winding NS12 or the terminal voltage across the two terminals of the eighth secondary winding NS42, an AC magnetic flux corresponding to the second secondary winding NS12 or the eighth secondary winding NS42 is generated.

The AC magnetic flux passing through the first sub-magnetic loop, the AC magnetic flux passing through the second sub-magnetic loop, the AC magnetic flux passing through the third sub-magnetic loop and the AC magnetic flux passing through the fourth sub-magnetic loop are cancelled out. Moreover, the remaining AC magnetic flux passes through the second magnetic cover 512, the first magnetic leg 513, the second magnetic leg 514, the third magnetic leg 516, the fourth magnetic leg 517 and the first magnetic cover 511 along a closed magnetic loop.

Moreover, in response to the DC currents flowing through the secondary windings NS11, NS12, NS21, NS22, N31, N32, N41 and N42, a circular magnetic flux is generated on the second magnetic cover 512. The circular magnetic flux surrounds the perforation 512*a*. In the circular magnetic loop, a first DC magnetic flux is generated in response to the DC currents flowing through the first secondary winding NS11 and the third secondary winding NS21, a second DC magnetic flux is generated in response to the DC currents flowing through the fourth secondary winding NS22 and the sixth secondary winding NS32, a third DC magnetic flux is generated in response to the DC currents flowing through the fifth secondary winding NS31 and the seventh secondary winding NS41, and a fourth DC magnetic flux is generated in response to the DC currents flowing through the second secondary winding NS12 and the eighth secondary winding NS42. The first DC magnetic flux, the second DC magnetic flux, the third DC magnetic flux and the fourth DC magnetic flux are equal. Consequently, the DC magnetic fluxes on the first magnetic leg 513, the second magnetic leg 514, the third magnetic leg 516, the fourth magnetic leg 517 and the first magnetic cover 511 are zero.

By adjusting the magnetic resistance of the closed magnetic loop in the second magnetic cover 512, the magnitudes of the ripple currents and the saturation currents flowing through the secondary windings NS11, NS12, NS21, NS22, N31, N32, N41 and N42 are correspondingly adjusted.

As mentioned above, the AC magnetic fluxes on every two adjacent magnetic legs of the first magnetic leg 513, the second magnetic leg 514, the third magnetic leg 516 and the fourth magnetic leg 517 have the same amplitude but opposite directions. In addition, the AC magnetic fluxes on the two magnetic legs at two ends of every diagonal line of the second magnetic cover 512 have the same amplitude and direction. Since the core area in the path of the AC magnetic flux of the first magnetic cover 511 is larger, the thickness of the first magnetic cover 511 is largely reduced. Moreover, the length of each sub-magnetic loop in the circular magnetic loop in the second magnetic cover 512 is one fourth of the length of the overall circular magnetic loop. Consequently, the power conversion module 1*c* of this embodiment has shorter magnetic path, smaller magnetic resistance, larger inductance and smaller output ripple current. Moreover, due to the structure of the magnetic core assembly 51*c* and the winding method as shown in FIG. 10, the size and the power loss of the magnetic device 5*c* are effectively reduced. When compared with the power conversion module using the magnetic device of FIG. 4, the output power from the power conversion module 1*c* using the magnetic device 5*c* is doubled. In this embodiment, the primary winding assembly is sequentially wound around the first magnetic leg 513, the second magnetic leg 514, the third magnetic leg 516 and the fourth magnetic leg 517. In an embodiment, the primary winding assembly is wound around one magnetic leg for many turns and then wound around the adjacent magnetic leg for many turns. In another embodiment, the primary winding assembly is sequentially wound around the first magnetic leg 513, the second magnetic leg 514, the third magnetic leg 516 and the fourth magnetic leg 517 for one turn, and the same procedure is repeatedly performed.

Figure 11:
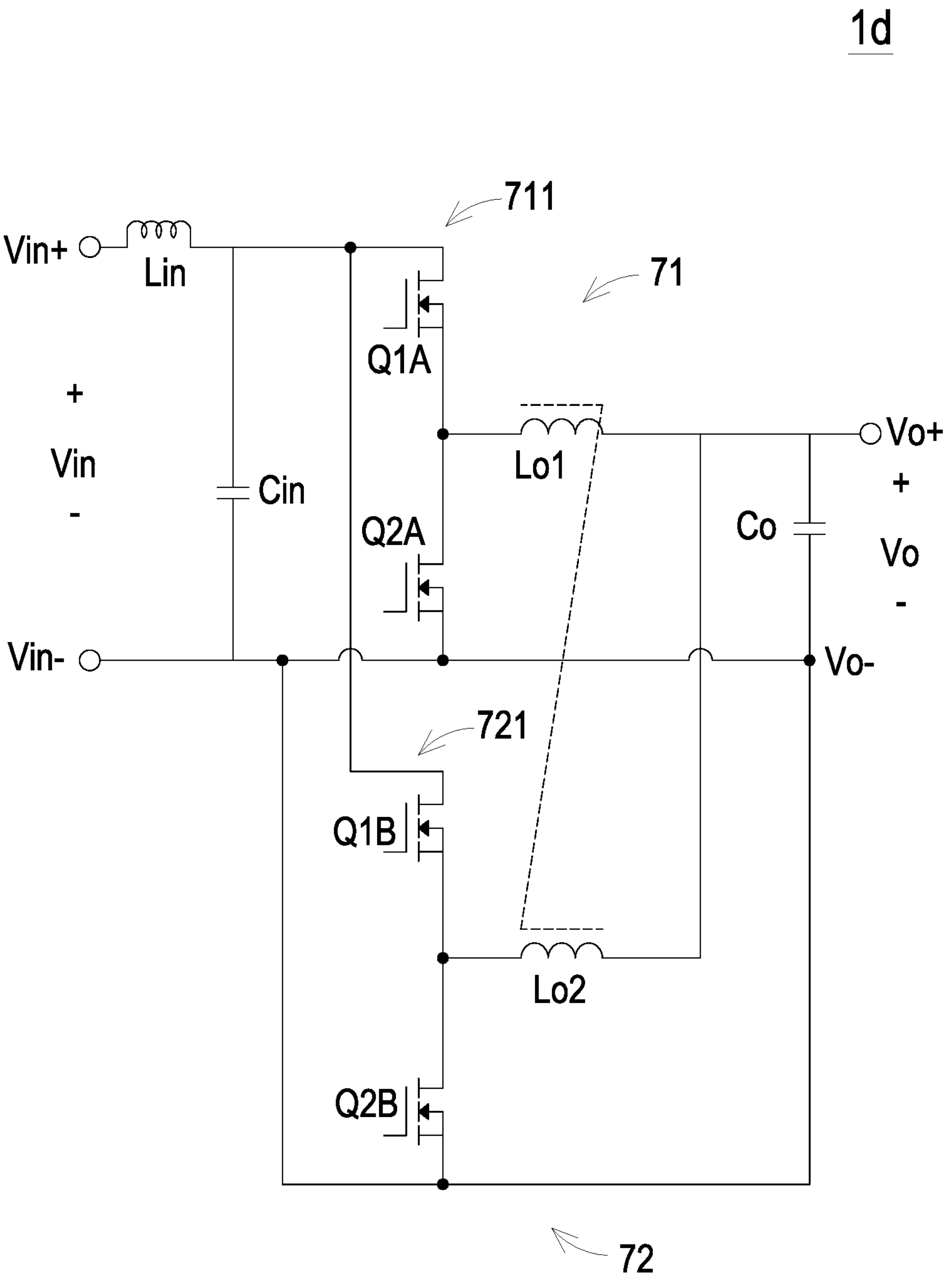
FIG. 11 is a schematic circuit diagram illustrating the circuitry topology of a power conversion module according to a fifth embodiment of the present disclosure.
Figure 12:
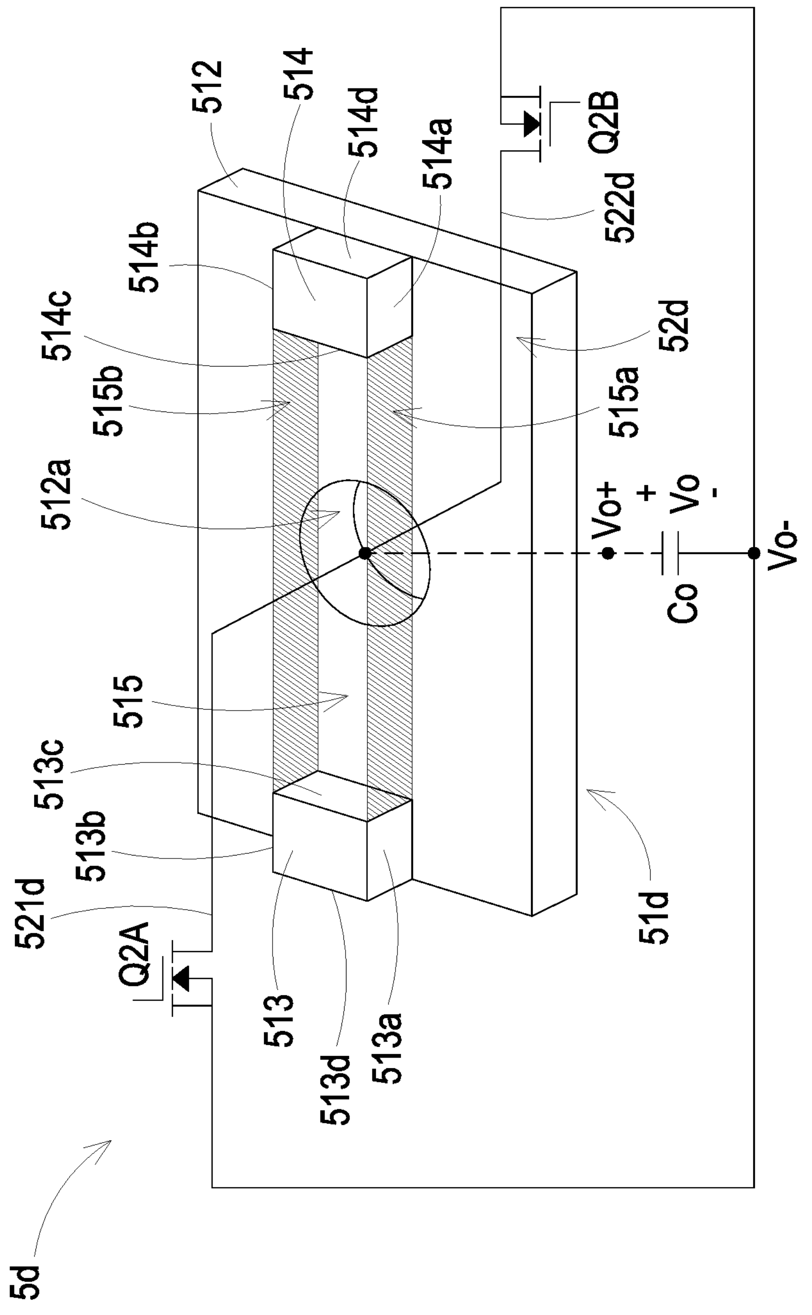
FIG. 12 schematically illustrates the magnetic core assembly and the winding assembly in the magnetic device of the power conversion module as shown in FIG. 11, in which the first magnetic cover is not shown.

Please refer to FIGS. 11 and 12. FIG. 11 is a schematic circuit diagram illustrating the circuitry topology of a power conversion module according to a fifth embodiment of the present disclosure. FIG. 12 schematically illustrates the magnetic core assembly and the winding assembly in the magnetic device of the power conversion module as shown in FIG. 11, in which the first magnetic cover is not shown.

The power conversion module 1*d* of this embodiment includes an input inductor Lin, an input capacitor Cin, a first phase buck circuit 71 and a second phase buck circuit 72.

The first terminal of the input inductor Lin is electrically connected with the input positive terminal Vin+. The input capacitor Cin is electrically connected between the second terminal of the input inductor Lin and the input negative terminal Vin−.

The first phase buck circuit 71 includes a first half-bridge arm 711 and a first output inductor Lo1. The two terminals of the first half-bridge arm 711 are respectively electrically connected with the second terminal of the input inductor Lin and the input negative terminal Vin−. The first half-bridge arm 711 and the input capacitor Cin are connected with each other in parallel. The first half-bridge arm 711 includes an upper switch Q1A and a lower switch Q2A. The upper switch Q1A and the lower switch Q2A are serially connected between the input positive terminal Vin+ and the input negative terminal Vin−. The first terminal of the first output inductor Lo1 is electrically connected with a node between the upper switch Q1A and the lower switch Q2A of the first half-bridge arm 711. The second terminal of the first output inductor Lo1 is electrically connected with the output positive terminal Vo+. The output negative terminal Vin− is electrically connected with the output negative terminal Vo−.

The second phase buck circuit 72 includes a second half-bridge arm 721 and a second output inductor Lo2. The two terminals of the second half-bridge arm 721 are respectively electrically connected with the second terminal of the input inductor Lin and the input negative terminal Vin−. The second half-bridge arm 721 and the input capacitor Cin are connected with each other in parallel. The second half-bridge arm 721 includes an upper switch Q1B and a lower switch Q2B. The upper switch Q1B is electrically connected with the input positive terminal Vin+. The lower switch Q2B is electrically connected with the input negative terminal Vin−. The first terminal of the second output inductor Lo2 is electrically connected with a node between the upper switch Q1B and the lower switch Q2B of the second half-bridge arm 721. The second terminal of the second output inductor Lo2 is electrically connected with the output positive terminal Vo+. In this embodiment, the phase difference between the driving signal for controlling the upper switch Q1A of the first half-bridge arm 711 and the driving signal for controlling the upper switch Q1B of the second half-bridge arm 721 is 180 degrees.

In this embodiment, the first output inductor Lo1 and the second output inductor Lo2 are magnetically coupled with each other and formed by the magnetic device 5*d* as shown in FIG. 12. The structure of the magnetic core assembly 51 of the magnetic device 5*d* in this embodiment is similar to the magnetic core assembly 51 of the magnetic device 5 as shown in FIG. 4. The winding assembly 52*d* of this embodiment includes a first winding 521*d* and a second winding 522*d*. The first terminal of the first winding 521*d* is close to the second terminal 513*b* of the first magnetic leg 513 and away from the first terminal 513*a* of the first magnetic leg 513. The first terminal of the first winding 521*d* is connected with the drain terminal of the lower switch Q2A of the first half-bridge arm 711. The second terminal of the first winding 521*d* is located at the middle region 515 and penetrated through the perforation 512*a* of the second magnetic cover 512. In addition, the second terminal of the first winding 521*d* is electrically connected with the output positive terminal Vo+ located outside the magnetic core assembly 51*d*. That is, the first winding 521*d* is transferred through the second communication portion 515*b*, and a portion of the first winding 521*d* is penetrated through the perforation 512*a* of the second magnetic cover 512. The first terminal of the second winding 522*d* is close to the first terminal 514*a* of the second magnetic leg 514 and away from the second terminal 514*b* of the second magnetic leg 514. The first terminal of the second winding 522*d* is connected with the drain terminal of the lower switch Q2B of the second half-bridge arm 721. The second terminal of the second winding 522*d* is located at the middle region 515 and penetrated through the perforation 512*a* of the second magnetic cover 512. In addition, the second terminal of the second winding 522*d* is electrically connected with the output positive terminal Vo+ located outside the magnetic core assembly 51*d*. That is, the second winding 522*d* is transferred through the first communication portion 515*a*, and a portion of the second winding 522*d* is penetrated through the perforation 512*a* of the second magnetic cover 512.

In an embodiment, the second terminal of the first winding 521*d* and the second terminal of the second winding 522*d* are connected with different output positive terminals. The first winding 521*d* is transferred into the middle region 515 through the second communication portion 515*b* and then penetrated through the perforation 512*a* of the second magnetic cover 512. The second winding 522*d* is transferred into the middle region 515 through the first communication portion 515*a* and then penetrated through the perforation 512*a* of the second magnetic cover 512. The source terminal of the lower switch Q2A of the first half-bridge arm 711 and the source terminal of the lower switch Q2B of the second half-bridge arm 712 are directly connected with each other and connected with the output negative terminal Vo−(or the second terminal of the output capacitor Co on the second surface of the circuit board). As a consequence, the first winding 521*d* and the magnetic core assembly 51*d* are magnetically coupled with each other and formed as the first output inductor Lo1 as shown in FIG. 11, and the second winding 522*d* and the magnetic core assembly 51*d* are magnetically coupled with each other and formed as the second output inductor Lo2 as shown in FIG. 11.

In this embodiment, the second terminal of the first winding 521*d* and the second terminal of the second winding 522*d* are electrically connected with each other. Particularly, the node between the second terminal of the first winding 521*d* and the second terminal of the second winding 522*d* is disposed within the middle region 515 of the magnetic core assembly 51. That is, the second terminal of the first winding 521*d* and the second terminal of the second winding 522*d* are connected to the node, and the node is further penetrated through the perforation 512*a* of the second magnetic cover 512.

In some other embodiments, the second terminal of the first winding 521*d* and the second terminal of the second winding 522*d* are electrically connected with each other. However, the node between the second terminal of the first winding 521*d* and the second terminal of the second winding 522*d* is located outside the magnetic core assembly 51. Particularly, the second terminal of the first winding 521*d* and the second terminal of the second winding 522*d* are penetrated through the perforation 512*a* of the second magnetic cover 512 and then connected with the node.

In an embodiment, the power conversion module 1*d* further includes a current-sharing circuit (not shown). Under control of the current-sharing circuit, the magnitude of the current flowing through the first output inductor Lo1 and the magnitude of the current flowing through the second output inductor Lo2 are identical. Consequently, the DC magnetic fluxes on the first magnetic leg 513, the first magnetic cover (e.g., the first magnetic cover as shown in FIG. 1D) and the second magnetic leg 514 are zero.

In some other embodiments, the magnitude of the current flowing through the first output inductor Lo1 and the magnitude of the current flowing through the second output inductor Lo2 are different. In this case, the magnetic loop of the first magnetic leg 513, the first magnetic cover and the second magnetic leg 514 has an air gap, and thus the magnetic saturation problem is avoided.

In some other embodiments, the second terminal of the first winding 521*d* and the second terminal of the second winding 522*d* are connected with the output positive terminal Vo+. Consequently, the power conversion module 1*d* provides a single output voltage.

In some other embodiments, the second terminal of the first winding 521*d* and the second terminal of the second winding 522*d* are not connected with each other. However, the second terminal of the first winding 521*d* and the second terminal of the second winding 522*d* provide respective output voltages. Consequently, the power conversion module 1*d* provides two output voltages.

In the above embodiments, the switches are MOSFET switches. It is noted that the examples of the switches are not restricted. For example, in some other embodiments, the switches are silicon carbide (SiC) switches, gallium nitride (GaN) switches or any other appropriate switches.

From the above descriptions, the present disclosure provides the power conversion module. The magnetic core assembly and the winding assembly in the magnetic device of the power conversion module are specially designed. Consequently, the voltage reduction function of the transformer is achieved. Moreover, two magnetic legs of the magnetic core assembly and two secondary windings of the winding assembly are magnetically coupled and formed as two secondary circuits. That is, the power conversion module with the single-stage converter can achieve the voltage reduction function. In comparison with the conventional power conversion module with two stage converters, the magnetic device of the power conversion module of the present disclosure has reduced volume, enhanced operating efficiency and increased applications. Moreover, the coupled windings of each coupled winding pair are penetrated through the perforation of the second magnetic cover. Consequently, a DC magnetic flux is generated in the closed magnetic loop of the second magnetic cover in response to the DC current flowing through each coupled winding pair. Since the DC magnetic fluxes on the magnetic legs and the first magnetic cover are zero, the volume of the magnetic device is further reduced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A magnetic device, comprising:

a magnetic core assembly comprising:

a first magnetic cover;

a second magnetic cover having at least one perforation; and a plurality of magnetic legs disposed between the first magnetic cover and the second magnetic cover, wherein a middle region is defined by the plurality of magnetic legs, the first magnetic cover and the second magnetic cover collaboratively, and the middle region is in communication with the at least one perforation, wherein the middle region comprises a plurality of communication portions, and the middle region is in communication with an external portion of the magnetic core assembly through the plurality of communication portions; and a winding assembly comprising at least one coupled winding pair, wherein two coupled windings of each coupled winding pair are respectively transferred through two different communication portions of the plurality of communication portions, and portions of the two coupled windings of each coupled winding pair are disposed within the middle region and penetrated through the at least one perforation of the second magnetic cover.

2. The magnetic device according to claim 1, wherein the magnetic device is disposed on a circuit board, wherein the circuit board comprises a first surface, a second surface and a plurality of openings, wherein the first surface and the second surface of the circuit board are opposed to each other, the first magnetic cover is disposed on the first surface of the circuit board, the second magnetic cover is disposed on the second surface of the circuit board, the plurality of openings run through the circuit board, and the plurality of magnetic legs are penetrated through the corresponding openings.

3. The magnetic device according to claim 1, wherein the two coupled windings of each coupled winding pair are secondary windings, wherein the secondary windings are respectively transferred through two different communication portions of the plurality of communication portions, and portions of the secondary windings are disposed within the middle region and penetrated through the at least one perforation of the second magnetic cover.

4. The magnetic device according to claim 3, wherein the plurality of magnetic legs include a first magnetic leg and a second magnetic leg, which are located at two opposite sides of the magnetic core assembly, wherein the middle region of the magnetic core assembly is arranged between the first magnetic leg and the second magnetic leg, a first communication portion of the plurality of communication portions is arranged between a first end of the first magnetic leg and a first end of the second magnetic leg, and a second communication portion of the plurality of communication portions is arranged between a second end of the first magnetic leg and a second end of the second magnetic leg.

5. The magnetic device according to claim 4, wherein the at least one coupled winding pair includes a first coupled winding pair and a second coupled winding pair, wherein the first coupled winding pair comprises a first secondary winding and a second secondary winding, and the second coupled winding pair comprises a third secondary winding and a fourth secondary winding, wherein the first secondary winding and the second secondary winding are formed as a part of a first secondary circuit, and the third secondary winding and the fourth secondary winding are formed as a part of a second secondary circuit, wherein a first terminal of the first secondary winding is located outside the magnetic core assembly and located near the first end of the first magnetic leg, a second terminal of the first secondary winding is penetrated through the at least one perforation of the second magnetic cover, and the first secondary winding is transferred through the first communication portion, wherein a second terminal of the second secondary winding is located outside the magnetic core assembly and located near the second end of the first magnetic leg, a first terminal of the second secondary winding is penetrated through the at least one perforation of the second magnetic cover, and the second secondary winding is transferred through the second communication portion, wherein a first terminal of the third secondary winding is located outside the magnetic core assembly and located near the first end of the second magnetic leg, a second terminal of the third secondary winding is penetrated through the at least one perforation of the second magnetic cover, and the third secondary winding is transferred through the first communication portion, wherein a second terminal of the fourth secondary winding is located outside the magnetic core assembly and located near the second end of the secondary magnetic leg, a first terminal of the fourth secondary winding is penetrated through the at least one perforation of the second magnetic cover, and the fourth secondary winding is transferred through the second communication portion;

wherein the second terminal of the first secondary winding, the first terminal of the second secondary winding, the second terminal of the third secondary winding and the first terminal of the fourth secondary winding are electrically connected with each other, and a node between the second terminal of the first secondary winding, the first terminal of the second secondary winding, the second terminal of the third secondary winding and the first terminal of the fourth secondary winding is disposed within the middle region of the magnetic core assembly or located outside the magnetic core assembly.

6. The magnetic device according to claim 5, wherein the winding assembly further comprises a primary winding assembly, wherein a first terminal of the primary winding assembly is close to the second end of the first magnetic leg and away from the first end of the first magnetic leg, and a second terminal of the primary winding assembly is close to the first end of the first magnetic leg and away from the second end of the first magnetic leg, wherein from the first terminal to the second terminal, the primary winding assembly is sequentially transferred through the second communication portion, the middle region and the first communication portion, wound around an outer side of the second magnetic leg, and sequentially transferred through the second communication portion, the middle region and the first communication portion, wherein a portion of the primary winding assembly wound around the first magnetic leg is a first primary winding, and another portion of the primary winding assembly wound around the second magnetic leg is a second primary winding, wherein the primary winding assembly is transferred through the middle region of the magnetic core assembly for two times, and the primary winding assembly crosses in the middle region of the magnetic core assembly;

wherein the primary winding assembly is wound around the first magnetic leg from the first terminal to the second terminal along a first direction, and the primary winding assembly is wound around the second magnetic leg from the first terminal to the second terminal along a second direction, wherein the first direction and the second direction are opposite.

7. The magnetic device according to claim 5, wherein the winding assembly further comprises a primary winding assembly, and the primary winding assembly comprises a first primary winding and a second primary winding, wherein the first primary winding and the second primary winding are connected with each other in parallel, the first primary winding is wound around the first magnetic leg, and the second primary winding is wound around the second magnetic leg.

8. The magnetic device according to claim 4, wherein the at least one coupled winding pair includes a first coupled winding pair, wherein the first coupled winding pair comprises a first secondary winding and a second secondary winding, and the first secondary winding and the second secondary winding are formed as a part of a first secondary circuit, wherein a first terminal of the first secondary winding is located outside the magnetic core assembly and located near the first end of the first magnetic leg, a second terminal of the first secondary winding is penetrated through the at least one perforation of the second magnetic cover, and the first secondary winding is transferred through the first communication portion, wherein a second terminal of the second secondary winding is located outside the magnetic core assembly and located near the second end of the first magnetic leg, a first terminal of the second secondary winding is penetrated through the at least one perforation of the second magnetic cover, and the second secondary winding is transferred through the second communication portion;

wherein the winding assembly further comprises a first primary winding, and the first primary winding is wound around the first magnetic leg.

9. The magnetic device according to claim 3, wherein the plurality of magnetic legs include a first magnetic leg, a second magnetic leg, a third magnetic leg and a fourth magnetic leg, wherein the first magnetic leg, the second magnetic leg, the third magnetic leg and the fourth magnetic leg are connected between the first magnetic cover and the second magnetic cover, wherein the first magnetic leg and the third magnetic leg are respectively located at two ends of a first diagonal line of the second magnetic cover, the second magnetic leg and the fourth magnetic leg are respectively located at two ends of a second diagonal line of the second magnetic cover, and the middle region is arranged between the first magnetic leg, the second magnetic leg, the third magnetic leg and the fourth magnetic leg, wherein a first communication portion of the plurality of communication portions is arranged between the first magnetic leg and the fourth magnetic leg, a second communication portion of the plurality of communication portions is arranged between the first magnetic leg and the second magnetic leg, a third communication portion of the plurality of communication portions is arranged between the second magnetic leg and the third magnetic leg, and a fourth communication portion of the plurality of communication portions is arranged between the third magnetic leg and the fourth magnetic leg.

10. The magnetic device according to claim 9, wherein the at least one coupled winding pair includes a first coupled winding pair, a second coupled winding pair, a third coupled winding pair and a fourth coupled winding pair, wherein the first coupled winding pair comprises a first secondary winding and a second secondary winding, the second coupled winding pair comprises a third secondary winding and a fourth secondary winding, the third coupled winding pair comprises a fifth secondary winding and a sixth secondary winding, and the fourth coupled winding pair comprises a seventh secondary winding and an eighth secondary winding, wherein the first secondary winding and the second secondary winding are formed as a part of a first secondary circuit, the third secondary winding and the fourth secondary winding are formed as a part of a second secondary circuit, the fifth secondary winding and the sixth secondary winding are formed as a part of a third secondary circuit, and the seventh secondary winding and the eighth secondary winding are formed as a part of a fourth secondary circuit, wherein a first terminal of the first secondary winding is located outside the magnetic core assembly and located near the second communication portion, a second terminal of the first secondary winding is penetrated through the at least one perforation of the second magnetic cover, and the first secondary winding is transferred through the second communication portion, wherein a second terminal of the second secondary winding is located outside the magnetic core assembly and located near the first communication portion, a first terminal of the second secondary winding is penetrated through the at least one perforation of the second magnetic cover, and the second secondary winding is transferred through the first communication portion, wherein a first terminal of the third secondary winding is located outside the magnetic core assembly and located near the second communication portion, a second terminal of the third secondary winding is penetrated through the at least one perforation of the second magnetic cover, and the third secondary winding is transferred through the second communication portion, wherein a second terminal of the fourth secondary winding is located outside the magnetic core assembly and located near the third communication portion, a first terminal of the fourth secondary winding is penetrated through the at least one perforation of the second magnetic cover, and the fourth secondary winding is transferred through the third communication portion, wherein a first terminal of the fifth secondary winding is located outside the magnetic core assembly and located near the fourth communication portion, a second terminal of the fifth secondary winding is penetrated through the at least one perforation of the second magnetic cover, and the fifth secondary winding is transferred through the fourth communication portion, wherein a second terminal of the sixth secondary winding is located outside the magnetic core assembly and located near the third communication portion, a first terminal of the sixth secondary winding is penetrated through the at least one perforation of the second magnetic cover, and the sixth secondary winding is transferred through the third communication portion, wherein a first terminal of the seventh secondary winding is located outside the magnetic core assembly and located near the fourth communication portion, a second terminal of the seventh secondary winding is penetrated through the at least one perforation of the second magnetic cover, and the seventh secondary winding is transferred through the fourth communication portion, wherein a second terminal of the eighth secondary winding is located outside the magnetic core assembly and located near the first communication portion, a first terminal of the eighth secondary winding is penetrated through the at least one perforation of the second magnetic cover, and the eighth secondary winding is transferred through the first communication portion.

11. The magnetic device according to claim 10, wherein the winding assembly further comprises a first primary winding, a second primary winding, a third primary winding and a fourth primary winding, wherein the first primary winding is transferred through the first communication portion, the middle region and the second communication portion, a first terminal of the first primary winding is located outside the magnetic core assembly and located near the first communication portion, a second terminal of the first primary winding is located outside the magnetic core assembly and located near the second communication portion, and the first primary winding is wound around the first magnetic leg from the first terminal of the first primary winding to the second terminal of the first primary winding along a first direction, wherein a first terminal of the second primary winding is connected with the second terminal of the first primary winding, the second primary winding is transferred through the third communication portion, the middle region and the second communication portion, the first terminal of the second primary winding is located outside the magnetic core assembly and located near the third communication portion, a second terminal of the second primary winding is located outside the magnetic core assembly and located near the second communication portion, and the second primary winding is wound around the second magnetic leg from the first terminal of the second primary winding to the second terminal of the second primary winding along a second direction, wherein a first terminal of the third primary winding is connected with the second terminal of the second primary winding, the third primary winding is transferred through the third communication portion, the middle region and the fourth communication portion, the first terminal of the third primary winding is located outside the magnetic core assembly and located near the third communication portion, a second terminal of the third primary winding is located outside the magnetic core assembly and located near the fourth communication portion, and the third primary winding is wound around the third magnetic leg from the first terminal of the third primary winding to the second terminal of the third primary winding along the first direction, wherein a first terminal of the fourth primary winding is connected with the second terminal of the third primary winding, the fourth primary winding is transferred through the first communication portion, the middle region and the fourth communication portion, the first terminal of the fourth primary winding is located outside the magnetic core assembly and located near the first communication portion, a second terminal of the fourth primary winding is located outside the magnetic core assembly and located near the fourth communication portion, and the fourth primary winding is wound around the fourth magnetic leg from the first terminal of the fourth primary winding to the second terminal of the fourth primary winding along the second direction, wherein the first direction and the second direction are opposite.

12. The magnetic device according to claim 1, wherein the first magnetic cover and the plurality of magnetic legs are made of ferrite or iron powder, and the second magnetic cover is made of ferrite or iron powder with a distributed air gap;

wherein the at least one perforation is located at a center region of the second magnetic cover.

13. The magnetic device according to claim 1, wherein the at least one coupled winding pair includes a first coupled winding pair, and the two coupled windings of the first coupled winding pair comprises a first winding and a second winding, wherein the first winding is a part of first inductor, and the second winding is a part of a second inductor, wherein the first winding and the second winding are respectively transferred through two different communication portions of the plurality of communication portions, and portions of the first winding and the second winding are disposed within the middle region and penetrated through the at least one perforation of the second magnetic cover.

14. The magnetic device according to claim 13, wherein the plurality of magnetic legs include a first magnetic leg and a second magnetic leg, which are located at two opposite sides of the magnetic core assembly, wherein the middle region of the magnetic core assembly is arranged between the first magnetic leg and the second magnetic leg, a first communication portion of the plurality of communication portions is arranged between a first end of the first magnetic leg and a first end of the second magnetic leg, and a second communication portion of the plurality of communication portions is arranged between a second end of the first magnetic leg and a second end of the second magnetic leg.

15. The magnetic device according to claim 14, wherein a first terminal of the first winding is located near the second end of the first magnetic leg, a second terminal of the first winding is penetrated through the at least one perforation of the second magnetic cover, and the first winding is transferred through the second communication portion, wherein a first terminal of the second winding is located near the first end of the second magnetic leg, a first terminal of the second winding is penetrated through the at least one perforation of the second magnetic cover, and the second winding is transferred through the first communication portion;

wherein the second terminal of the first winding and the second terminal of the second winding are electrically connected with each other, and a node between the second terminal of the first winding and the second terminal of the second winding is disposed within the middle region of the magnetic core assembly or located outside the magnetic core assembly, or the second terminal of the first winding and the second terminal of the second winding are connected with different output positive terminals.

16. The magnetic device according to claim 1, wherein when a DC current flows through each coupled winding pair, a circular magnetic flux is generated in response to the DC current, wherein the circular magnetic flux surrounds the at least one perforation of the second magnetic cover, and magnetic fluxes passing through the first magnetic cover and the plurality of magnetic legs in response to the DC current are zero.

17. A power conversion module comprising a magnetic device, the magnetic device comprising:

a magnetic core assembly comprising:

a first magnetic cover;

a second magnetic cover having at least one perforation; and a plurality of magnetic legs disposed between the first magnetic cover and the second magnetic cover, wherein a middle region is defined by the plurality of magnetic legs, the first magnetic cover and the second magnetic cover collaboratively, and the middle region is in communication with the at least one perforation, wherein the middle region comprises a plurality of communication portions, and the middle region is in communication with an external portion of the magnetic core assembly through the plurality of communication portions; and a winding assembly comprising at least one coupled winding pair, wherein two coupled windings of each coupled winding pair are respectively transferred through two different communication portions of the plurality of communication portions, and portions of the two coupled windings of each coupled winding pair are disposed within the middle region and penetrated through the at least one perforation of the second magnetic cover.

18. The power conversion module according to claim 17, wherein the power conversion module further comprises a circuit board and a switching circuit, and the switching circuit and the magnetic device are disposed on the circuit board, wherein the circuit board comprises a first surface, a second surface and a plurality of openings, wherein the first surface and the second surface of the circuit board are opposed to each other, the first magnetic cover is disposed on the first surface of the circuit board, the second magnetic cover is disposed on the second surface of the circuit board, the plurality of openings run through the circuit board, and the plurality of magnetic legs are penetrated through the corresponding openings.

19. The power conversion module according to claim 18, wherein the two coupled windings of each coupled winding pair are secondary windings, wherein the secondary windings are respectively transferred through two different communication portions of the plurality of communication portions, and portions of the secondary windings are disposed within the middle region and penetrated through the at least one perforation of the second magnetic cover.

20. The power conversion module according to claim 19, wherein the plurality of magnetic legs include a first magnetic leg and a second magnetic leg, which are located at two opposite sides of the magnetic core assembly, wherein the middle region of the magnetic core assembly is arranged between the first magnetic leg and the second magnetic leg, a first communication portion of the plurality of communication portions is arranged between a first end of the first magnetic leg and a first end of the second magnetic leg, and a second communication portion of the plurality of communication portions is arranged between a second end of the first magnetic leg and a second end of the second magnetic leg.

21. The power conversion module according to claim 20, wherein the power conversion module further comprises a first rectifying switch, a second rectifying switch, a third rectifying switch and a fourth rectifying switch, which are disposed on the circuit board, wherein the at least one coupled winding pair includes a first coupled winding pair and a second coupled winding pair, wherein the first coupled winding pair comprises a first secondary winding and a second secondary winding, and the second coupled winding pair comprises a third secondary winding and a fourth secondary winding, wherein the first secondary winding, the second secondary winding, the first rectifying switch, and the second rectifying switch are formed as a first secondary circuit, wherein a first terminal of the first secondary winding is located outside the magnetic core assembly and located near the first end of the first magnetic leg, and the first terminal of the first secondary winding is electrically connected with the first rectifying switch, a second terminal of the first secondary winding is penetrated through the at least one perforation of the second magnetic cover, and the first secondary winding is transferred through the first communication portion, wherein a second terminal of the second secondary winding is located outside the magnetic core assembly and located near the second end of the first magnetic leg, and the second terminal of the second secondary winding is electrically connected with the second rectifying switch, a first terminal of the second secondary winding is penetrated through the at least one perforation of the second magnetic cover, and the second secondary winding is transferred through the second communication portion, wherein the third secondary winding, the fourth secondary winding, the third rectifying switch and the fourth rectifying switch are formed as a second secondary circuit, wherein a first terminal of the third secondary winding is located outside the magnetic core assembly and located near the first end of the second magnetic leg, and the first terminal of the third secondary winding is electrically connected with the third rectifying switch, a second terminal of the third secondary winding is penetrated through the at least one perforation of the second magnetic cover, and the third secondary winding is transferred through the first communication portion, wherein a second terminal of the fourth secondary winding is located outside the magnetic core assembly and located near the second end of the second magnetic leg, and the second terminal of the fourth secondary winding is electrically connected with the fourth rectifying switch, a first terminal of the fourth secondary winding is penetrated through the at least one perforation of the second magnetic cover, and the fourth secondary winding is transferred through the second communication portion;

wherein the second terminal of the first secondary winding, the first terminal of the second secondary winding, the second terminal of the third secondary winding and the first terminal of the fourth secondary winding are electrically connected with each other, and a node between the second terminal of the first secondary winding, the first terminal of the second secondary winding, the second terminal of the third secondary winding and the first terminal of the fourth secondary winding is disposed within the middle region of the magnetic core assembly or located outside the magnetic core assembly.

22. The power conversion module according to claim 21, wherein the winding assembly further comprises a primary winding assembly, wherein a first terminal of the primary winding assembly is close to the second end of the first magnetic leg and away from the first end of the first magnetic leg, and a second terminal of the primary winding assembly is close to the first end of the first magnetic leg and away from the second end of the first magnetic leg, wherein from the first terminal to the second terminal, the winding assembly is sequentially transferred through the second communication portion, the middle region and the first communication portion, wound around an outer side of the second magnetic leg, and sequentially transferred through the second communication portion, the middle region and the first communication portion, wherein a portion of the primary winding assembly wound around the first magnetic leg is a first primary winding, and another portion of the primary winding assembly wound around the second magnetic leg is a second primary winding, wherein the primary winding assembly is transferred through the middle region of the magnetic core assembly for two times, and the primary winding assembly crosses in the middle region of the magnetic core assembly, wherein the primary winding assembly is wound around the first magnetic leg from the first terminal to the second terminal along a first direction, and the primary winding assembly is wound around the second magnetic leg from the first terminal to the second terminal along a second direction, wherein the first direction and the second direction are opposite.

23. The power conversion module according to claim 21, wherein the winding assembly further comprises a primary winding assembly, and the primary winding assembly comprises a first primary winding and a second primary winding, wherein the first primary winding and the second primary winding are connected with each other in parallel, the first primary winding is wound around the first magnetic leg, and the second primary winding is wound around the second magnetic leg.

24. The power conversion module according to claim 20, wherein the power conversion module further comprises a first rectifying switch and a second rectifying switch, which are disposed on the circuit board, wherein the at least one coupled winding pair includes a first coupled winding pair, wherein the first coupled winding pair comprises a first secondary winding and a second secondary winding, and the first secondary winding, the second secondary winding, the first rectifying switch and the second rectifying switch are formed as a first secondary circuit, wherein a first terminal of the first secondary winding is located outside the magnetic core assembly and located near the first end of the first magnetic leg, and the first terminal of the first secondary winding is electrically connected with the first rectifying switch, a second terminal of the first secondary winding is penetrated through the at least one perforation of the second magnetic cover, and the first secondary winding is transferred through the first communication portion, wherein a second terminal of the second secondary winding is located outside the magnetic core assembly and located near the second end of the first magnetic leg, and the second terminal of the second secondary winding is electrically connected with the second rectifying switch, a first terminal of the second secondary winding is penetrated through the at least one perforation of the second magnetic cover, and the second secondary winding is transferred through the second communication portion;

wherein the primary winding assembly further comprises a first primary winding, and the first primary winding is wound around the first magnetic leg.

25. The power conversion module according to claim 19, wherein the plurality of magnetic legs include a first magnetic leg, a second magnetic leg, a third magnetic leg and a fourth magnetic leg, wherein the first magnetic leg, the second magnetic leg, the third magnetic leg and the fourth magnetic leg are connected between the first magnetic cover and the second magnetic cover, wherein the first magnetic leg and the third magnetic leg are respectively located at two ends of a first diagonal line of the second magnetic cover, the second magnetic leg and the fourth magnetic leg are respectively located at two ends of a second diagonal line of the second magnetic cover, and the middle region is arranged between the first magnetic leg, the second magnetic leg, the third magnetic leg and the fourth magnetic leg, wherein a first communication portion of the plurality of communication portions is arranged between the first magnetic leg and the fourth magnetic leg, a second communication portion of the plurality of communication portions is arranged between the first magnetic leg and the second magnetic leg, a third communication portion of the plurality of communication portions is arranged between the second magnetic leg and the third magnetic leg, and a fourth communication portion of the plurality of communication portions is arranged between the third magnetic leg and the fourth magnetic leg.

26. The power conversion module according to claim 25, wherein the power conversion module further comprises a first rectifying switch, a second rectifying switch, a third rectifying switch, a fourth rectifying switch, a fifth rectifying switch, a sixth rectifying switch, a seventh rectifying switch and an eighth rectifying switch, which are disposed on the circuit board, wherein the at least one coupled winding pair includes a first coupled winding pair, a second coupled winding pair, a third coupled winding pair and a fourth coupled winding pair, wherein the first coupled winding pair comprises a first secondary winding and a second secondary winding, the second coupled winding pair comprises a third secondary winding and a fourth secondary winding, the third coupled winding pair comprises a fifth secondary winding and a sixth secondary winding, and the fourth coupled winding pair comprises a seventh secondary winding and an eighth secondary winding, wherein the first secondary winding, the second secondary winding, the first rectifying switch and the second rectifying switch are formed as a first secondary circuit, wherein a first terminal of the first secondary winding is located outside the magnetic core assembly and located near the second communication portion, and the first terminal of the first secondary winding is electrically connected with the first rectifying switch, a second terminal of the first secondary winding is penetrated through the at least one perforation of the second magnetic cover, and the first secondary winding is transferred through the second communication portion, wherein a second terminal of the second secondary winding is located outside the magnetic core assembly and located near the first communication portion, and the second terminal of the second secondary winding is electrically connected with the second rectifying switch, a first terminal of the second secondary winding is penetrated through the at least one perforation of the second magnetic cover, and the second secondary winding is transferred through the first communication portion, wherein the third secondary winding, the fourth secondary winding, the third rectifying switch and the fourth rectifying switch are formed as a second secondary circuit, wherein a first terminal of the third secondary winding is located outside the magnetic core assembly and located near the second communication portion, and the first terminal of the third secondary winding is electrically connected with the third rectifying switch, a second terminal of the third secondary winding is penetrated through the at least one perforation of the second magnetic cover, and the third secondary winding is transferred through the second communication portion, wherein a second terminal of the fourth secondary winding is located outside the magnetic core assembly and located near the third communication portion, and the second terminal of the fourth secondary winding is electrically connected with the fourth rectifying switch, a first terminal of the fourth secondary winding is penetrated through the at least one perforation of the second magnetic cover, and the fourth secondary winding is transferred through the third communication portion, wherein the fifth secondary winding, the sixth secondary winding, the fifth rectifying switch and the sixth rectifying switch are formed as a third secondary circuit, wherein a first terminal of the fifth secondary winding is located outside the magnetic core assembly and located near the fourth communication portion, and the first terminal of the fifth secondary winding is electrically connected with the fifth rectifying switch, a second terminal of the fifth secondary winding is penetrated through the at least one perforation of the second magnetic cover, and the fifth secondary winding is transferred through the fourth communication portion, wherein a second terminal of the sixth secondary winding is located outside the magnetic core assembly and located near the third communication portion, and the second terminal of the sixth secondary winding is electrically connected with the sixth rectifying switch, a first terminal of the sixth secondary winding is penetrated through the at least one perforation of the second magnetic cover, and the sixth secondary winding is transferred through the third communication portion, wherein the seventh secondary winding, the eighth secondary winding, the seventh rectifying switch and the eighth rectifying switch are formed as a fourth secondary circuit, wherein a first terminal of the seventh secondary winding is located outside the magnetic core assembly and located near the fourth communication portion, and the first terminal of the seventh secondary winding is electrically connected with the seventh rectifying switch, a second terminal of the seventh secondary winding is penetrated through the at least one perforation of the second magnetic cover, and the seventh secondary winding is transferred through the fourth communication portion, wherein a second terminal of the eighth secondary winding is located outside the magnetic core assembly and located near the first communication portion, and the second terminal of the eighth secondary winding is electrically connected with the eighth rectifying switch, a first terminal of the eighth secondary winding is penetrated through the at least one perforation of the second magnetic cover, and the eighth secondary winding is transferred through the first communication portion.

27. The power conversion module according to claim 26, wherein the winding assembly further comprises a first primary winding, a second primary winding, a third primary winding and a fourth primary winding, wherein the first primary winding is transferred through the first communication portion, the middle region and the second communication portion, a first terminal of the first primary winding is located outside the magnetic core assembly and located near the first communication portion, a second terminal of the first primary winding is located outside the magnetic core assembly and located near the second communication portion, and the first primary winding is wound around the first magnetic leg from the first terminal of the first primary winding to the second terminal of the first primary winding along a first direction, wherein a first terminal of the second primary winding is connected with the second terminal of the first primary winding, the second primary winding is transferred through the third communication portion, the middle region and the second communication portion, the first terminal of the second primary winding is located outside the magnetic core assembly and located near the third communication portion, a second terminal of the second primary winding is located outside the magnetic core assembly and located near the second communication portion, and the second primary winding is wound around the second magnetic leg from the first terminal of the second primary winding to the second terminal of the second primary winding along a second direction, wherein a first terminal of the third primary winding is connected with the second terminal of the second primary winding, the third primary winding is transferred through the third communication portion, the middle region and the fourth communication portion, the first terminal of the third primary winding is located outside the magnetic core assembly and located near the third communication portion, a second terminal of the third primary winding is located outside the magnetic core assembly and located near the fourth communication portion, and the third primary winding is wound around the third magnetic leg from the first terminal of the third primary winding to the second terminal of the third primary winding along the first direction, wherein a first terminal of the fourth primary winding is connected with the second terminal of the third primary winding, the fourth primary winding is transferred through the first communication portion, the middle region and the fourth communication portion, the first terminal of the fourth primary winding is located outside the magnetic core assembly and located near the first communication portion, a second terminal of the fourth primary winding is located outside the magnetic core assembly and located near the fourth communication portion, and the fourth primary winding is wound around the fourth magnetic leg from the first terminal of the fourth primary winding to the second terminal of the fourth primary winding along the second direction, wherein the first direction and the second direction are opposite.

28. The power conversion module according to claim 18, wherein the power conversion module further comprises an encapsulation structure, and the encapsulation structure comprises a covering surface and a lateral wall, wherein the second surface of the circuit board and at least one component on the second surface of the circuit board are encapsulated by the encapsulation structure, wherein a positive input contact, a negative input contact, a positive output contact, two negative output contacts and a plurality of signal contacts are formed on the covering surface of the encapsulation structure, and the positive output contact is electrically connected with the two coupled windings of each coupled winding pair through the circuit board;

wherein the power conversion module further comprises a conductive post, and the conductive post is disposed on a center region of the second surface of the circuit board, wherein the conductive post is aligned with the perforation of the second magnetic cover, protruded outside the second magnetic cover and protruded in a direction away from the circuit board, wherein the conductive post is electrically connected with the at least one coupled winding pair through electrical traces in the circuit board.

29. The power conversion module according to claim 17, wherein the at least one coupled winding pair includes a first coupled winding pair, and the two coupled windings of the first coupled winding pair comprises a first winding and a second winding, wherein the first winding is a part of first inductor, and the second winding is a part of a second inductor, wherein the first winding and the second winding are respectively transferred through two different communication portions of the plurality of communication portions, and portions of the first winding and the second winding are disposed within the middle region and penetrated through the at least one perforation of the second magnetic cover;

wherein the plurality of magnetic legs include a first magnetic leg and a second magnetic leg, which are located at two opposite sides of the magnetic core assembly, wherein the middle region of the magnetic core assembly is arranged between the first magnetic leg and the second magnetic leg, a first communication portion of the plurality of communication portions is arranged between a first end of the first magnetic leg and a first end of the second magnetic leg, and a second communication portion of the plurality of communication portions is arranged between a second end of the first magnetic leg and a second end of the second magnetic leg, wherein a first terminal of the first winding is located near the second end of the first magnetic leg, a second terminal of the first winding is penetrated through the at least one perforation of the second magnetic cover, and the first winding is transferred through the second communication portion, wherein a first terminal of the second winding is located near the first end of the second magnetic leg, a second terminal of the second winding is penetrated through the at least one perforation of the second magnetic cover, and the second winding is transferred through the first communication portion;

wherein the second terminal of the first winding and the second terminal of the second winding are electrically connected with each other, and a node between the second terminal of the first winding and the second terminal of the second winding is disposed within the middle region of the magnetic core assembly or located outside the magnetic core assembly, or the second terminal of the first winding and the second terminal of the second winding are connected with different output positive terminals.

* * * * *